US008700696B2

(12) United States Patent
Franke

(10) Patent No.: US 8,700,696 B2
(45) Date of Patent: *Apr. 15, 2014

(54) METHOD AND SYSTEM FOR CONDUCTING A PLURALITY OF CYBER-BASED CONVENTIONS

(75) Inventor: Paul D. Franke, Venetia, PA (US)

(73) Assignee: Software Management, Inc., Pittsburgh, PA (US)

( * ) Notice: Subject to any disclaimer, the term of this patent is extended or adjusted under 35 U.S.C. 154(b) by 199 days.

This patent is subject to a terminal disclaimer.

(21) Appl. No.: 11/873,706

(22) Filed: Oct. 17, 2007

(65) Prior Publication Data

US 2008/0091662 A1    Apr. 17, 2008

Related U.S. Application Data

(63) Continuation of application No. 09/869,513, filed as application No. PCT/US99/31285 on Dec. 30, 1999, now Pat. No. 7,702,720.

(60) Provisional application No. 60/114,396, filed on Dec. 31, 1998, provisional application No. 60/114,128, filed on Dec. 30, 1998.

(51) Int. Cl.
 *G06F 15/16*    (2006.01)

(52) U.S. Cl.
 USPC ........... 709/203; 709/204; 709/205; 709/229; 705/26.1; 705/27.1; 705/14.4; 705/80; 707/790; 707/706; 707/607

(58) Field of Classification Search
 USPC ........ 709/203–205, 229; 707/1, 3, 4, 10, 100, 707/200, 790, 706, 607; 705/26, 27, 80, 705/26.1, 27.1, 14.4
 See application file for complete search history.

(56) References Cited

U.S. PATENT DOCUMENTS

| | | | |
|---|---|---|---|
| 4,233,661 A | 11/1980 | Bolton et al. | |
| 4,654,793 A | 3/1987 | Elrod | |
| 5,323,314 A | 6/1994 | Baber et al. | |
| 5,491,743 A | 2/1996 | Shiio et al. | |
| 5,627,978 A | 5/1997 | Altom et al. | |
| 5,689,553 A | 11/1997 | Ahuja et al. | |
| 5,758,079 A | 5/1998 | Ludwig et al. | |
| 5,764,916 A | 6/1998 | Busey et al. | |

(Continued)

OTHER PUBLICATIONS

Eventweb, vol. 2, Issue 12, "Virtual Trade Shows", BlueDot Software, Inc., Mar. 25, 1997.
Meeting News, vol. 20, No. 16, "New Software Is Said to Make Creation of Virtual Shows a Snap", Oct. 21, 1996.

(Continued)

*Primary Examiner* — Mohammad A Siddiqi
(74) *Attorney, Agent, or Firm* — The Webb Law Firm

(57) ABSTRACT

A method of providing content information to at least one user on the Internet, by facilitating an exchange between at least one sponsor and the at least one user. The method includes receiving, from the at least one sponsor with a web browser computer, and electronically setting, loading, inputting, or any combination thereof at a central website server, searchable content information which includes at least one searchable keyword; receiving, from the at least one user with a web browser computer, at the central website server, a query including at least one search keyword; processing the query at the central website server by searching for the at least one search keyword within the searchable content information; and releasing, from the central website server to the at least one user, content information selected based upon the processing of the query.

20 Claims, 14 Drawing Sheets

(56) References Cited

U.S. PATENT DOCUMENTS

| | | | |
|---|---|---|---|
| 5,784,546 A | | 7/1998 | Benman, Jr. |
| 5,802,296 A | | 9/1998 | Morse et al. |
| 5,808,613 A | | 9/1998 | Marrin et al. |
| 5,809,247 A | | 9/1998 | Richardson et al. |
| 5,832,229 A | | 11/1998 | Tomoda et al. |
| 5,847,709 A | | 12/1998 | Card et al. |
| 5,850,250 A | | 12/1998 | Konopka et al. |
| 5,855,006 A | | 12/1998 | Huemoeller et al. |
| 5,859,663 A | | 1/1999 | Simon |
| 5,859,974 A | | 1/1999 | McArdle et al. |
| 5,859,979 A | | 1/1999 | Tung et al. |
| 5,911,045 A | | 6/1999 | Leyba et al. |
| 5,933,811 A | * | 8/1999 | Angles et al. ............... 705/14.56 |
| 5,948,040 A | * | 9/1999 | DeLorme et al. ............. 701/201 |
| 5,963,913 A | | 10/1999 | Henneuse et al. |
| 6,067,525 A | | 5/2000 | Johnson et al. |
| 6,073,124 A | | 6/2000 | Krishnan et al. |
| 6,182,050 B1 | * | 1/2001 | Ballard ....................... 705/14.61 |
| 6,185,603 B1 | | 2/2001 | Henderson et al. |
| 6,269,369 B1 | | 7/2001 | Robertson |
| 6,285,985 B1 | * | 9/2001 | Horstmann ................ 705/14.61 |
| 6,285,987 B1 | * | 9/2001 | Roth et al. ....................... 705/27 |
| 6,332,135 B1 | | 12/2001 | Conklin et al. |
| 6,343,313 B1 | | 1/2002 | Salesky et al. |
| 6,421,729 B1 | | 7/2002 | Paltenghe et al. |
| 6,487,538 B1 | * | 11/2002 | Gupta et al. ............... 705/14.66 |
| 6,493,690 B2 | | 12/2002 | Bertrand et al. |
| 6,572,662 B2 | | 6/2003 | Manohar et al. |
| 6,598,027 B1 | * | 7/2003 | Breen et al. ................ 705/26.25 |
| 6,604,085 B1 | * | 8/2003 | Kolls ........................ 705/14.23 |
| 7,039,599 B2 | | 5/2006 | Merriman et al. |
| 7,065,500 B2 | * | 6/2006 | Singh et al. .................. 705/26.1 |
| 7,133,835 B1 | | 11/2006 | Fusz et al. |
| 7,386,600 B1 | * | 6/2008 | Philyaw ....................... 709/217 |
| 7,590,688 B2 | | 9/2009 | Franke |
| 7,702,720 B1 | | 4/2010 | Franke |
| 7,739,139 B2 | | 6/2010 | Robertson et al. |
| 2009/0292768 A1 | | 11/2009 | Franke |

OTHER PUBLICATIONS

Listing of Virtual Trade Shows, Expocity.Com, Jan. 31, 1998.
American Heart Association's 70th Scientific Sessions Online Welcome Page, Expocity.Com, Dec. 22, 1997.
"Net Results Using the Internet to Reach International Exhibitors and Attendees", EXPO Magazine, Feb. 1998.
"Expanding the Reach of Expositions and Trade Shows, A Look at Today's Technology" BlueDot Software, Inc., Aug. 19, 1996.
vREG, online registration system, Jun. 24, 1997.
"American-Academy of Physician Assistants Chooses Avicenna; Avicenna Reaches 32,000 Register Users", PR Newswire, Sep. 16, 1996.
"Medtrade online at www.medtrade.com; The official healthcare industry virtual trade show site to be available on SEMCO Productions", Business Wire, Aug. 5, 1996.
"vEXPO Technology by BlueDot", BlueDot Software, Inc., 1997.
"Broadvision Uses Its On-line Marketing Database to Deliver Personalised World Wide Web Sites", Newswire; Trade Mar. 21, 1996.
"GeoCities Partners with StarPoint to Serve Millions of Personalized Ads Daily", PR Newswire, Jul. 21, 1997.
"Poppe Tyson Partners with Atlanta Software Leader to Form Doubleclick—The First Advertising Network for the Internet", PR Newswire, Feb. 5, 1996.
"Broadvision 2: The Angle. The First Site with a Brain. Yours. The Angle is helping people make sense of the Web—faster, easier and smarter than ever before", Business Wire, Sep. 3, 1996.
"Broadvision: Personalized Marketing and Selling on the Internet Unleashed by BroadVision; One-To-One Application System Helps Marketers Build Long-Term Relationships Through Personalized Content, Services and Promotions", Business Wire, Jan. 22, 1996.
U.S. Appl. No. 13/272,753, filed Oct. 13, 2011.
Tri-fold advertisement for expoexchangeTM, entitled "Log on. Sit Back. Cash in"; at least as early as Sep. 2001.
Convention NETSM Brochure, Software Management, Inc. Pittsburgh, PA 1993.

* cited by examiner

METHOD AND SYSTEM FOR CONDUCTING A PLURALITY OF CYBER-BASED CONVENTIONS

BACKGROUND OF THE INVENTION

1. Field of Invention

The present invention relates to the field of networked computer systems. Specifically, the present invention relates to the field of sharing information in an Internet-based convention system.

2. Description of the Related Art

Convention, event, conference, trade show and meeting ("convention") attendance for all parties involved ("clients") is currently a costly, time-consuming process. Travel costs and the size of many conventions have made gathering of information at a convention a much less efficient process. For large conventions, there is a need for a systematic method of locating exhibitors and retrieving information. The widespread availability of computers with graphics capabilities and Internet connectivity makes it feasible to use them to simulate various aspects of a convention to augment or replace a visit to the physical conference location.

Many attendees would like to attend a convention through the convenience of the Internet and web-browser computers. Many professional meeting planners working with associations or corporations would like to set up and hold their conventions only on the Internet or to support or augment their venue-based conventions. And, many exhibitor/sponsors would like to participate at a convention through the convenience of the Internet.

Until now, there has been no suitable way to enable these three fundamental "clients" to participate with the full functions of the convention industry using the convenience of the Internet. The meeting planner client needs to perform the central processing functions to load and control their specific virtual convention, trade show or meeting. The exhibitor/sponsor client needs to perform the processing functions to design, load and control their specific exhibits and sponsor orders related to conventions, trade shows or meetings that meet their specific marketing and participation criteria. Finally, an attendee client needs a wide array of sensible convention functions including: convention selection, association selection, conference search, events search, show search, session and forum attendance and exhibit display visits.

A variety of methods involving an attendee client viewing exhibit booths in a virtual-only trade show or participating in a session and forum have been implemented resembling an Internet-based convention. Despite these resemblances, significant omissions were determined upon reviewing these websites and comparing methods in terms of the invention.

Of primary importance in terms of omission was that all sites demonstrated a single-specific convention situation (e.g., single association, single industry, single product classification). No sites were found offering a plurality of separate conventions, nor were methods found to support multiple conventions.

Another primary omission was that all sites were either solely "venue-based content convention" or solely "cyber-based content convention" in terms of any methods demonstrated. No combination "venue-with-cyber" methods were demonstrated for allowing the creation of a "virtual convention venue" for conventions that exist on the central website server while concurrently supporting and augmenting a convention being held in a physical or venue-based center.

Another primary omission was that no methods were demonstrated for meeting planner client services; it appeared that meeting and convention content information and support control, if any, were pre-loaded by a webmaster/programmer.

Another primary omission was that no methods were demonstrated for exhibitor/sponsor client services. It appeared that exhibit booth design, content and processing flow, if any, were again pre-loaded or built by a webmaster/programmer. Also, the important method presented in the invention of using exhibit booth panel sizes made up of advertising standard ad banner sizes was not demonstrated.

Fundamentally, the sites appeared to place overall design emphasis only on the trade show aspects and not the other important activities of the complete convention. Attendee client methods were generally limited to simple listings and displays of exhibitor information. A wide range of convention activity simulated with the program instructions and the databases presented in this invention were missing from the sites reviewed. By way of illustration, no attendee client methods were demonstrated for call for papers, paper and proceedings presentations, membership signup, or board and committee messages. No attendee client methods were demonstrated for searching a wide range of sessions and forums by subjects or a certain speaker, or searching a plurality of conventions with extensive criteria. The exhibit content searches, when offered, were very limited.

A complete industry-standard convention includes not only trade show aspects of exhibitor booths, but also registration, sessions and forums, special events, sponsor recognition, call for papers, paper and proceedings presentations, general convention information, board and committee meetings, helpful maps, hotel support participants, CVB support participants, etc. And, three distinct and essential parties are involved in the activities to hold a successful convention: 1) the meeting planner client, who defines, organizes, and sets it up; 2) the exhibitor/sponsor client who exhibits products or services, or sponsors the various aspects; and 3) the attendee client who participates in the various functions. The robust activities of these three parties that make up a complete industry-standard convention held in a virtual convention venue were not demonstrated. Therefore, no altogether satisfactory method has heretofore been available for conducting multiple Internet-based conventions, events, conferences, trade shows and meetings.

The most complete example of a single-specific convention site coupled with solely "venue-based content-convention" was the IAAM 1999 Annual Conference and Trade Show. IAAM 1999 Annual Conference and Trade Show, Internet address cyber-centre.com/98iaam, demonstrated only convention content information for a single-specific venue-based event. There was a simple list of exhibitors with a solitary front-end booth lobby graphic with links to venue-based event information pages, but no exhibitor/sponsor client booths. No attendee client, meeting planner client or exhibitor/sponsor client methods were demonstrated.

BRIEF SUMMARY OF THE INVENTION

The present invention advantageously fills the aforementioned deficiency in the prior art by providing a method and system for conducting multiple Internet-based conventions, events, conferences, trade shows and meetings ("conventions") including the meeting planner clients, exhibitor/sponsor clients and attendee clients, all using web browser computers and a central website server on the Internet. The invention includes a method for conducting conventions by facilitating an exchange between meeting planner clients and attendee clients. This exchange includes electronically storing convention content information at a central website, receiving selections for convention content information from attendee clients, and releasing the selected convention content information to the attendee clients. The system receives and stores initial convention data, and control parameter rules from meeting planner clients. Then the system receives and stores exhibit booth display data and control parameter rules for said convention from exhibitor/sponsor clients. Based on search criteria provided by the participating attendee client, the central website server releases stored database convention information and provides a wide array of convention activity simulated with the program instructions and the databases. Thus, the system allows the creation of a "virtual convention venue" for conventions that exist only on the central website server and available using the Internet. Additionally, the system supports and augments a convention being held in a physical or venue-based center (such as Moscone Center in San Francisco).

The present invention is a computer system and a method for the use of computers for implementing an Internet-based, virtual convention venue. The invention includes the computer implementation of functions associated with conventions, described here as "cyber" functions. These computer-implemented functions included attendee control, database capabilities for locating convention information, a cyber exhibit booth display system, cyber sessions and forums, cyber attendee profiler alerts, cyber meeting planner support system, and cyber exhibitor and sponsor support system, and procedures for making use of them via remote computers.

The computer system implementation also allows the creation of cyber conventions that exist only virtually, based on the Internet. The computer system can also be implemented to produce an on-line convention that is related to convention occurring at a physical location, referred to here as a venue-based convention.

DESCRIPTION OF THE DRAWINGS

The accompanying drawings provide a further understanding of the invention and are incorporated in and constitute a part of this specification. The drawings illustrate preferred embodiments of the invention, and, together with the description, serve to explain the principles of the invention.
In the drawings.

DETAILED DESCRIPTION OF THE INVENTION

System Structure

Figure 1:
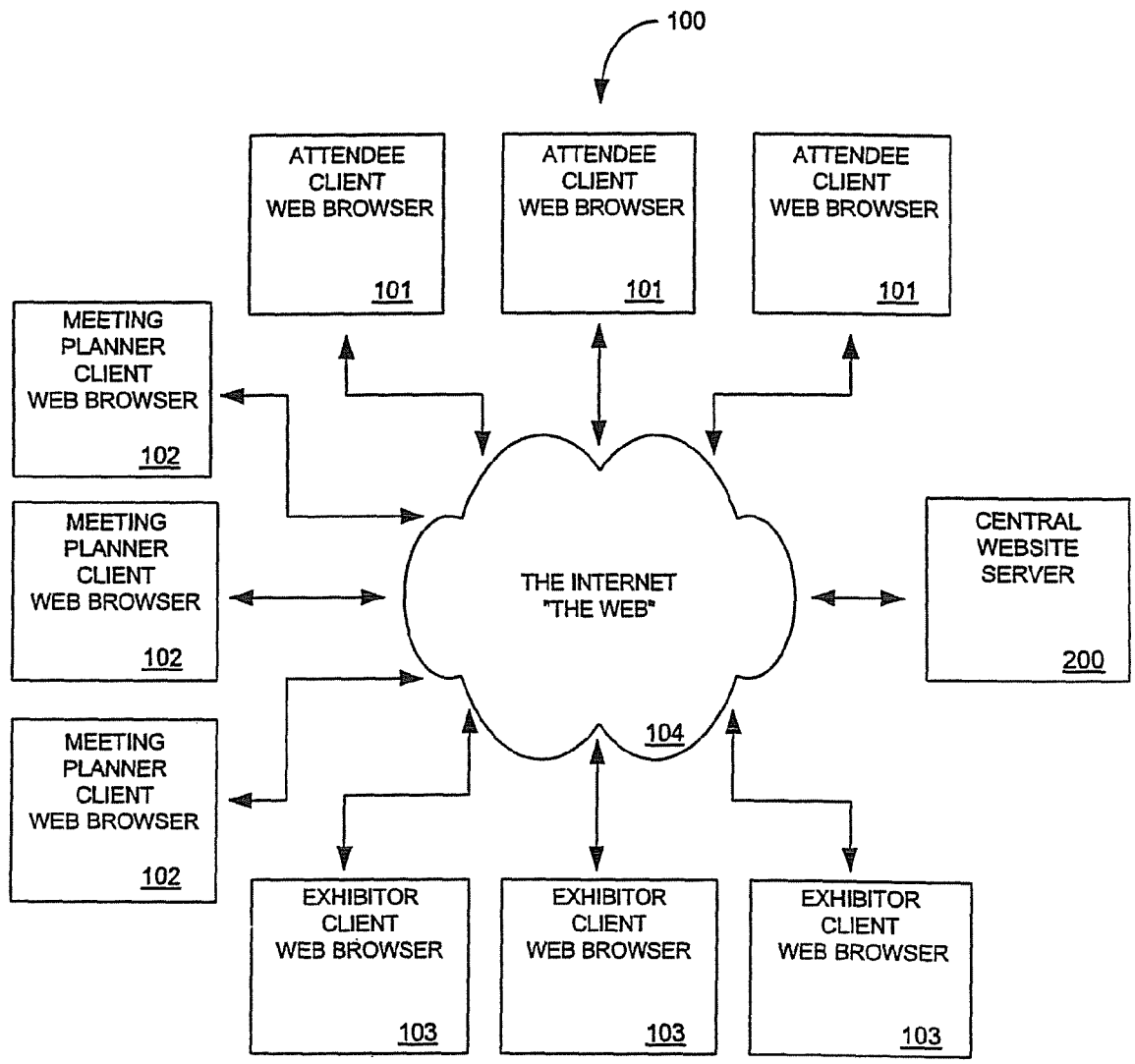
FIG. 1 illustrates a schematic overview of one embodiment of the present invention.

FIG. 1 is an overall system block diagram illustrating a convention system 100 and presents a preferred embodiment of the present invention. In this embodiment, the central website server 200 is linked up over the Internet or the Web 104 to one of three separate client types implemented as standard web browser computers: an attendee client 101, a meeting planner client 102, or an exhibitor/sponsor client 103. A virtual convention venue transaction, such as a web page display or database search query, can be initiated by any one of the clients 101, 102, or 103 by means of a web browser computer. FIG. 1 illustrates the relationship of each type of client 101, 102 and 103, and their respective computers, to the central website server 200. The information required to implement the transaction is passed between any one of the clients 101, 102, or 103 through a web browser computer, and the central website server 200 until the transaction is complete. The central website server 200 processes and keeps track of all transactions in the system.

The overall virtual convention venue process normally begins with a meeting planner client 102 who launches a standard web browser software program, such as Netscape Navigator or Microsoft Internet Explorer, and establishes connection with the central website server 200 across The Web 104. The central website server 200 performs the central processing functions to load and control the specific virtual convention, trade show or meeting of meeting planner client 102. Multiple meeting planner clients 102 are depicted in the diagram to represent an open-ended number of meeting planner clients and subsequent conventions, trade shows and meetings. The term "meeting planner client" is also used in a manner similar to current use in the convention industry to designate an individual (or association) that organizes and manages a convention, event, conference or trade show.

Next, an exhibitor/sponsor client 103 establishes connection with the central website server 200 across The Web 104. The central website server 200 performs the processing functions to design, load and control the specific exhibits and sponsor orders related to specific virtual conventions, trade shows or meetings of exhibitor/sponsor to client 103. Multiple exhibitor/sponsor clients 103 are depicted in the diagram to represent an open-ended number of exhibitors and sponsors and subsequent exhibitor booths and advertising. The term "exhibitor/sponsor client" is also used in a manner similar to current use in the convention industry to designate an individual or business organization that exhibits booths at a convention, event, conference or trade show; or, is a sponsor of such.

Finally, an attendee client 101 establishes connection with the central website server 200 across The Web 104. The central website server 200 now performs the functions of database query and page display processing including: convention selection, association selection, conference search, events search, show search, session and forum attendance and exhibit display visits. Again, multiple attendee clients 101 are depicted in the diagram to represent an open-ended number of convention, trade show and meeting attendees. The term "attendee" is also used in a manner similar to current use in the convention industry to designate an individual that attends a convention, event, conference, or trade show.

Alternatively to beginning with only the meeting planner client 102, the virtual convention venue process can also begin with either the meeting planner client 102 or an exhibitor/sponsor client 103.

Figure 2:
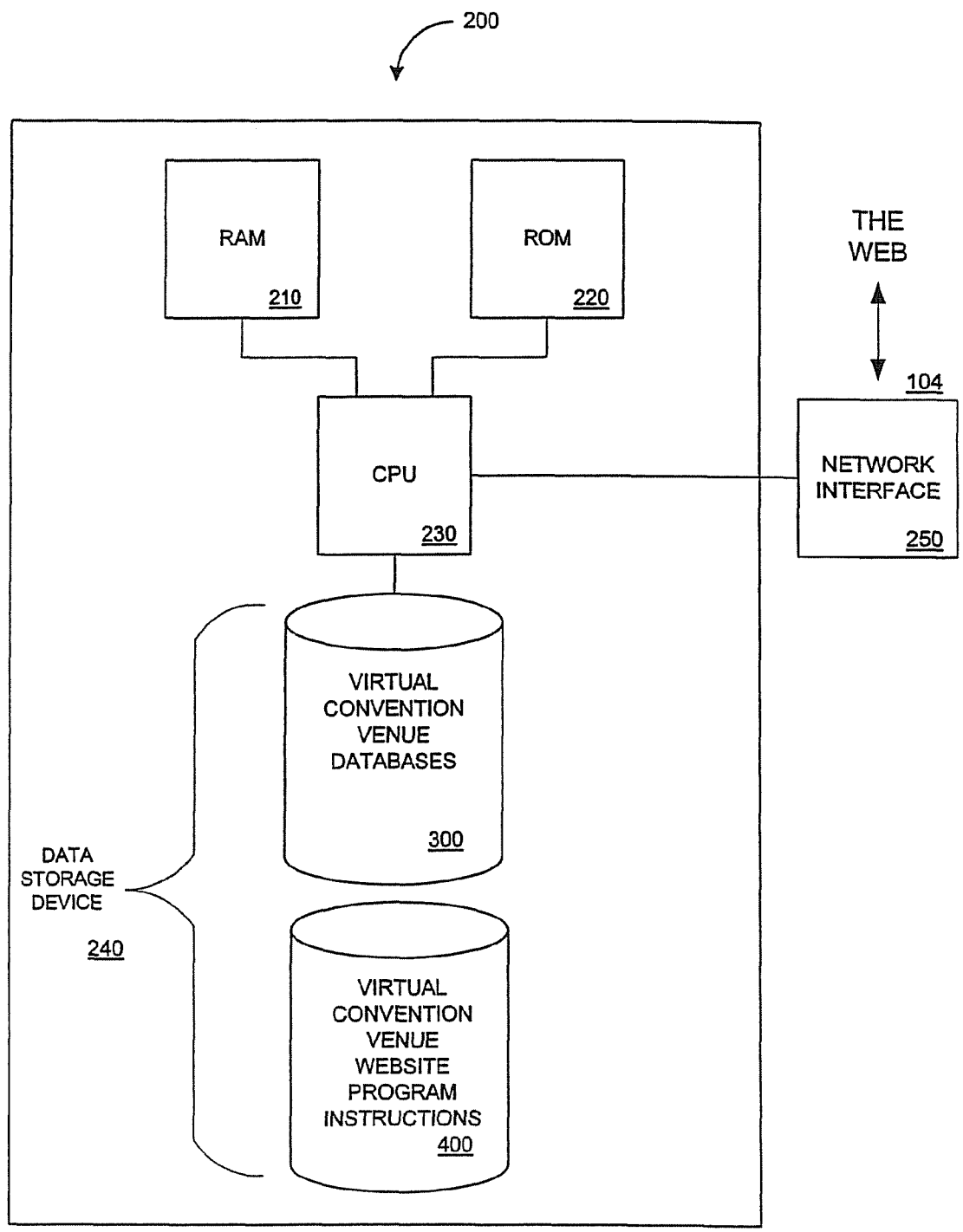
FIG. 2 illustrates a block diagram of the central website server of the system in accordance with the embodiment in FIG. 1.

FIG. 2 illustrates a block diagram of the central website server 200 implemented as a standard computer file server capable of high-volume web initiated transactions. As shown in FIG. 2, the central website server includes a central processor unit or CPU 230, RAM 210, ROM 220, network interface 250, and data storage device 240. The data storage device 240 includes virtual convention venue databases 300, as well as the virtual convention venue program instructions 400 for CPU 230. CPU 230 is connected to each of the computer elements of the central website server 200.

CPU 230 may comprise a conventional high-speed processor capable of executing program instructions to perform the functions described herein. Although the central website server 200 is described as being implemented with a single CPU 230, in alternative embodiments the central website server 200 could be implemented with several processors operating in parallel or in series. Similarly, the other components of the central website server 200 could be expanded to handle larger volumes of web-initiated transactions and accommodate several different communication protocols.

The use of a CPU 230 in conjunction with ROM 220, RAM 210, a data storage device 240 and network interface 250 to The Web 104 is well known to those skilled in the art of computer file server website design.

Figure 3:
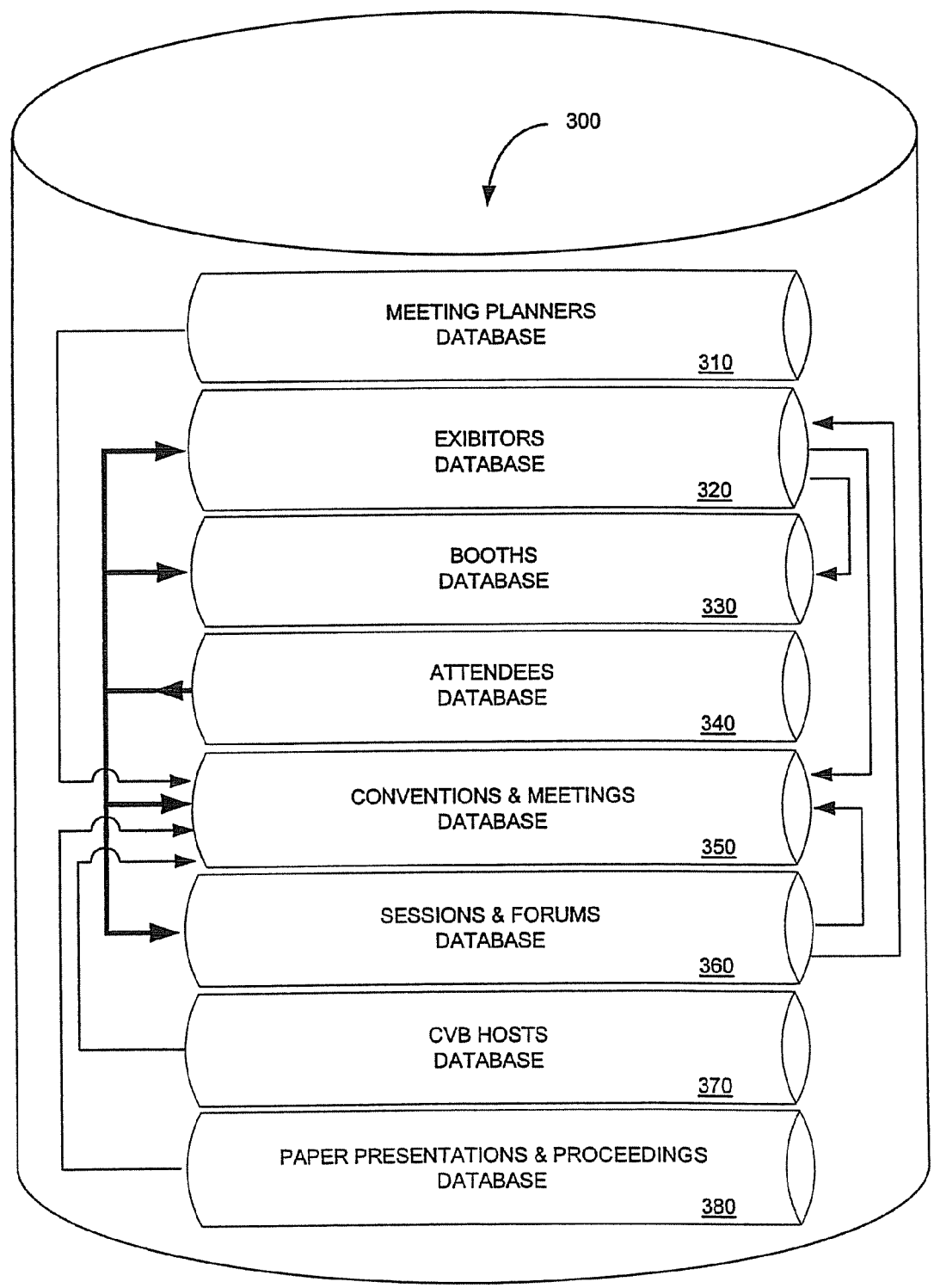
FIG. 3 illustrates a block diagram of the virtual convention venue databases and relationships in accordance with the embodiment in FIG. 1.

FIG. 3 illustrates a block diagram of the virtual convention venue databases 300 and key record relationships including meeting planners database 310, exhibitors/sponsors database 320, booths database 330, attendees database 340, conventions database 350, sessions and forums database 360, convention and visitors bureau ("CVB") hosts databases 370, and paper presentations and proceedings database 380. The databases in venue databases 300 may be implemented as standard relational databases (such as Microsoft SQL Server7) capable of supporting searching and storing records with standard field characteristics including alpha, numeric, alphanumeric, currency, yes/no, OLE object, hyperlink, as well as multimedia information such as video data, movies, photographs, and audio data.

The exhibitors/sponsors database 320 may include cross-referencing fields to booths database 330. This allows multiple booths for each exhibitor/sponsor. Also, the exhibitors/sponsors database 320 may include cross-referencing fields to the conventions database 350. This allows for multiple exhibitors/sponsors per convention and for an exhibitor/sponsor to participate in multiple conventions. The sessions and forums database 360 may include cross-referencing fields to the conventions database 350. This allows multiple sessions for each convention. The sessions and forums database 360 also may include cross-referencing fields to the exhibitors/sponsors database 320. This allows multiple exhibitors/sponsors to host or finance a convention session or sessions. The meeting planners database 310 may include cross-referencing fields to the conventions database 350; this allows multiple conventions for each meeting planner. The conventions and visitors bureau ("CVB") hosts database 370 may include cross-referencing fields to the conventions database 350. This allows a CVB to host multiple conventions. The paper presentations and proceedings database 380 may include cross-referencing fields to the conventions database 350. This allows multiple technical or professional papers to be presented and multiple meeting proceedings to be documented at a convention or meeting. Finally, the attendees database 340 may include cross-referencing fields to exhibitors/sponsors database 320, conventions database 350, sessions and forums database 360, and booths database 330. This allows tracking as well as other types of searches related to the attendees.

The use of relational databases in conjunction with website computer program instructions is well known to those skilled in the art of computer programming.

As noted above, the meeting planners database 310 may include cross-referencing fields to the conventions database 350; this allows multiple conventions for each meeting planner. Also, the meeting planners database 310 may include fields concerning individual meeting planners such as account number, name/address information, URL and e-mail information, passwords, association logo and a keyword array.

As noted above, the exhibitors/sponsors database 320 may include cross-referencing fields to booths database 330; this allows multiple booths for each exhibitor/sponsor. Also, the exhibitors/sponsors database 320 preferably includes cross-referencing fields to the conventions database 350; this allows for multiple exhibitors/sponsors per convention and for an exhibitor/sponsor to participate in multiple conventions. Cross-referencing fields are also provided to the sessions and forums database 360 for sessions sponsored, and the attendees database 340 for attendees interested, viewed exhibit or contacted. Also, the exhibitors/sponsors database 320 may include fields concerning individual exhibitors/sponsors such as name/address information, URL and e-mail information, passwords, exhibitor/sponsor logo, exhibit page control, sponsor package, welcome banners, session sponsor advertising information, and venue-based switch control.

As noted above, the booths database 330 may include cross-referencing fields to the exhibitors/sponsors database 320; this allows multiple booths for each exhibitor/sponsor. Also, the booths database 330 preferably includes cross-referencing fields to the attendees database 340 for attendees interested, viewed exhibit or wishing further information. Also, the booths database 330 preferably includes cross-referencing fields to the conventions database 350 for the various conventions at which the booth appears. The booths database 330 may include fields concerning booth design type, an array of panels making up the booth, and the booth processing flow control. Fields also include accounting control and related cost totals, descriptions, exhibit subject(s) and keyword(s), exhibitor text, and venue-based switch control.

The attendees database 340 may include cross-referencing fields to exhibitors/sponsors database 320—for exhibitors and sponsors of interest, contacted and booth viewed. Cross-referencing fields are also provided to the conventions database 350—for specific convention registrations, previous attendance and interests. Cross-referencing fields are also provided to the sessions and forums database 360—for specific session and forum registrations, previous attendance and interests. Cross-referencing fields are also provided to the booths database 330—for specific booth interest and attendance. Fields also include name/address information, e-mail information, passwords, attendance package control, venue-based switch control, paid convention accounting control array, credit card information, interest codes array, and association affiliations array.

The conventions database 350 is at the heart of the invention. Cross-referencing fields are provided to the meeting planners database 310 tying in the specific convention to the meeting planner hosting and controlling the event. Cross-referencing fields are provided to the exhibitors/sponsors database 320, tying in all related exhibitors and sponsors. Cross-referencing fields are provided to the booths database 330, tying the booths to the convention. Cross-referencing fields are provided to the attendees database 340, tying in the attendees. Cross-referencing fields are provided to the sessions and forums database 360 and CVB hosts database 370, tying the sessions and CVBs respectively. Finally, cross-referencing fields are provided to the paper presentations and proceedings database 380, tying in the multiple papers and proceedings, as appropriate. Fields also include convention content information such as:

convention name, convention type including standard convention, conference, event, or trade show;
  conference name;
  event name;
  trade show name;
  convention dates (virtual- and venue-based);
  convention theme;
  association name;
  association acronym;
  association subjects;
  welcome message;
  convention overview;
  convention logo;
  convention registration fees;
  exhibitor/sponsor client registration edit criteria control parameters;
  exhibitor/sponsor client booth criteria control parameters;
  attendee client registration edit criteria control parameters;
  sessions and forums processing flow control parameters;
  call for papers processing flow control parameters;
  cyber broadcast processing flow control parameters;
  potential exhibitor and sponsor contacts;
  convention phone number;
  convention fax number;
    board and committee messages/reports;
    program plug-ins and downloads;
    convention URL address; and,
    convention e-mail address.

Further fields in conventions database 350 differentiated for the convention parameter type equal to "venue-with-cyber" include:
  venue-based name and address information;
  venue-based pictures;
  venue-based registration information;
  venue-based registration fees;
  venue-based exhibitor floor maps;
  geographic location;
  recommended dress;
  average temperatures at the venue-based destination;
  direction information for boards and committees;
  housing bureau involvement and program link control with URL links;
  hotel participants and accommodations with URL links;
  travel arrangements with URL links;
  convention and visitor bureau ("CVB") participants with URL links;
  rental car transportation with URL links;
  venue-based destination parking with URL links; and,
  sponsors list with URL links.

As noted above, the sessions and forums database 360 may include cross-referencing fields to the conventions database 350, allowing multiple sessions and forums for each convention, tied to the said convention. This tie to the convention also provides a cross-link tie to the paper presentations and proceedings database 380, and subsequent information such as individual papers presented and session and forum proceedings. Further, the sessions and forums database 360 includes cross-referencing fields to the exhibitors/sponsors database 320 allowing multiple exhibitors and sponsors to host or finance a session or sessions. As described above, the sessions and forums database 360 also has cross-referencing fields to the attendees database 340 for the multiple attendees attending each session or forum. Further fields in the sessions and forums database 360 include speaker name, session or forum name, subject(s), sponsor copy words, session or forum copy words, dates/times, special fees, handout materials, audio-visual notes, multimedia control, and presenter. Further fields in the sessions and forums database 360 differentiated for the convention parameter type equal to "venue-with-cyber" include venue-based floor maps of the sessions and forums.

As noted above, the convention and visitors bureau ("CVB") hosts database 370 may include cross-referencing fields to the conventions database 350 allowing a CVB to host multiple conventions. Fields in the CVB database 370 include CVB name/address-type information, URL and e-mail addresses, special banner or other advertising.

As noted above, the paper presentations and proceedings database 38Q may include cross-referencing fields to the conventions database 350 allowing multiple technical or professional papers to be presented and multiple meeting proceedings to be documented at a convention or meeting. Further fields in the paper presentations and proceedings database 380 include author, URL and email addresses, academic affiliation, keywords, abstracts, paper title, summary, paper text detail, figures, audio-visual notes, and multimedia control.

Figure 4:
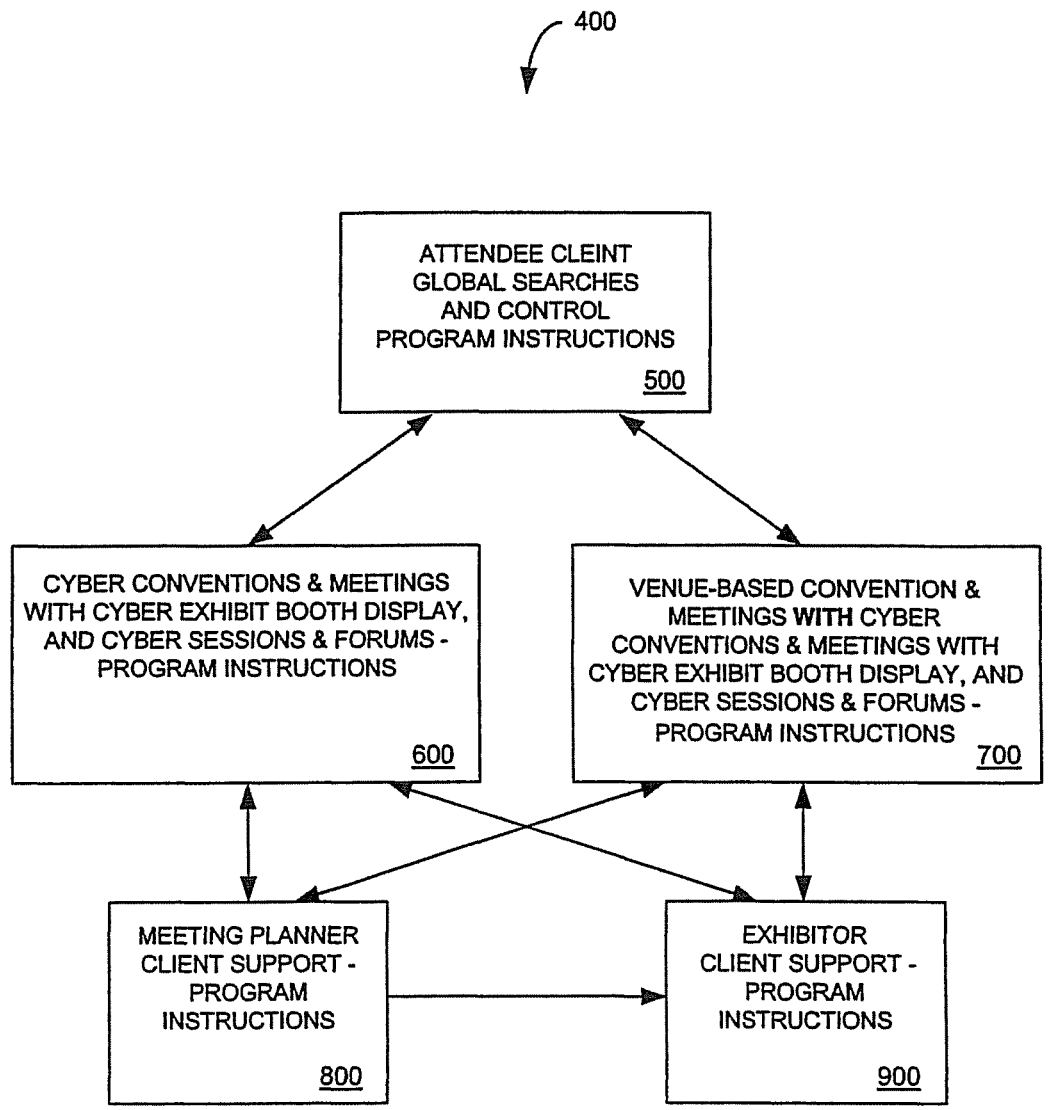
FIG. 4 illustrates a block diagram of the virtual convention venue program instructions in accordance with the embodiment in FIG. 1.

FIG. 4 illustrates a block diagram of the virtual convention venue website program instructions 400. CPU 230 (FIG. 2) is programmed with program instructions 400 using standard website programming languages such as HTML, CFML, Javascript, or CSS, and executes various functions described in connection with FIGS. 5-9. These program instructions 400 can comprise, but are not limited to, flow control, web page display or a search query to the virtual convention venue databases 300 initiated by any one of the clients 101, 102, or 103 by way of web browser computers, to which information is transmitted in response. The use of program instructions 400 in conjunction with relational databases 300 on a central website server 200 is well known to those skilled in the art of computer programming and website design. These program instructions 400 comprise the information input, processing and output procedures including but not limited to receiving queries, control parameters and content information from any of the three client types, processing in terms of differentiating and storing the information, and releasing appropriate and formatted information. Described in simplest terms, the attendee client global searches and control program instructions 500 on the central website server 200 assists the attendee client 101 in determining what conventions are appropriate for their participation, "registering" and "attending" a convention in the virtual convention venue databases 300. The term "attendee" is also used in a manner similar to current use in the convention industry to designate an individual that attends a convention, event, conference, or trade show. The attendee client global searches and control program instructions 500 are described in greater detail in connection with FIG. 5.

The meeting planner client support program instructions 800 on the central website server 200 assists the meeting planner client 102 in setting up, organizing, and controlling a convention in the virtual convention venue databases 300 linked up over The Web 104. The meeting planner client support program instructions 800 are described in greater detail in connection with FIG. 8.

Similarly, the exhibitor/sponsor client support program instructions 900 on the central website server 200 assist the exhibitor/sponsor client 103 in determining what conventions are appropriate for their participation, and in ordering and setting up a booth (or booths) and sponsorship at a convention in the virtual convention venue databases 300. The exhibitor/sponsor client support program instructions 900 are described in greater detail in connection with FIG. 9.

The attendee client global searches and control program instructions 500 on the central website server 200 assists the attendee client 101 in determining what conventions are appropriate for their participation, "registering" and "attending" a convention in the virtual convention venue databases 300. The attendee client global searches and control program instructions 500 are described in greater detail in connection with FIG. 5.

Block 600 in FIG. 4 illustrates the program instructions on the central website server 200 associated with flow control, web page display or query to the virtual convention venue databases 300 with respect to a 100% "cyber-based" convention. The computer system implementation allows the creation of cyber conventions that exist only in virtual reality, based on the Internet. It is important to note that the program instructions 600 may be configured to execute only IF the convention defined in conventions database 350 is only 100% cyber-based e.g., not a convention also being held in a physical (venue-based) center such as The Moscone Center in San Francisco (venue based convention). The attendee client 101 now has a wide array of convention activity simulated with the program instructions and the databases. These activities are described in greater detail in connection with FIG. 6.

Block 700 on FIG. 4 illustrates the program instructions on the central website server 200 associated with flow control, web page display or query to the virtual convention venue databases 300 with respect to a "cyber-based" convention augmenting a venue-based convention. The computer system implementation allows the creation of a cyber convention available to attendees at any time before, during, or after a venue-based convention. Again, the program instructions 700 may be configured to execute with or in support of a venue-based convention. The attendee client 101 has a wide array of activity simulated with the program instructions and the databases. These activities are described in greater detail in connection with FIG. 7.

System Operation

The operation of system 100 is now further described in connection with the sitemap flow diagrams shown in FIGS. 5, 6, 7, 8 and 9 and reference the sample exhibit booth displays shown in FIGS. 10A-10J. The use of sitemap flow diagrams in conjunction with website computer program instructions is well known to those skilled in the art of computer programming.

System 100, through the computer programs 400 described below and the interaction with the virtual convention venue databases 300 on the central website server 200, provides the method and apparatus for conducting multiple Internet-based conventions. Because of modern relational database storage capabilities and the database design presented herein, it is important to note that the invention accommodates, simultaneously, a number of conventions, meeting planner clients, exhibitor/sponsor clients, attendee clients, exhibitor/sponsor booths, sessions and forums, technical or professional papers, proceedings documents, and CVB hosts.

Figure 5:
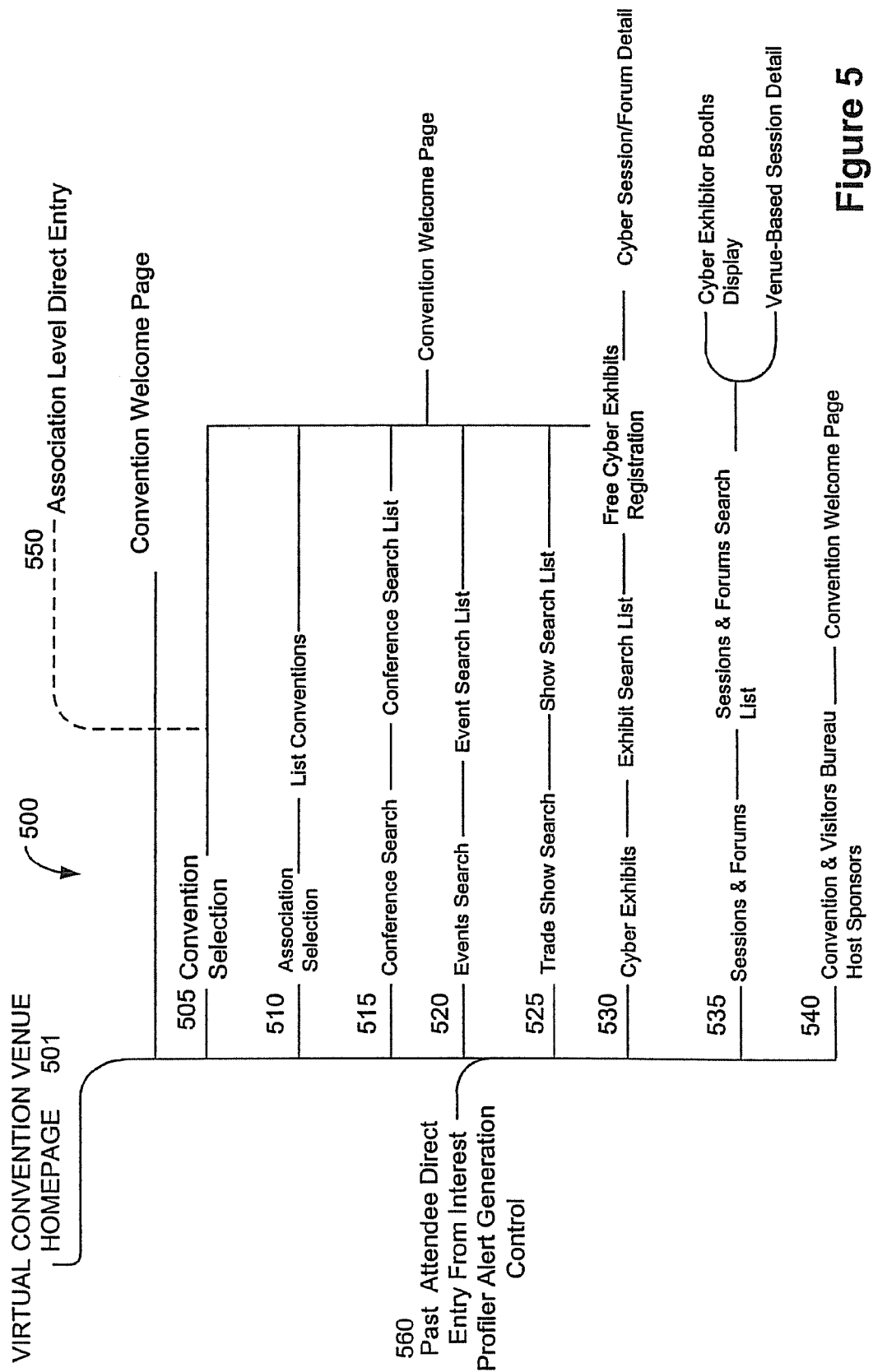
FIG. 5 illustrates a sitemap flow diagram of the attendee client global searches and control program instructions in accordance with this invention.

FIG. 5 illustrates a sitemap flow diagram of the attendee client global searches and control program instructions 500 in accordance with one embodiment of the invention. From the virtual convention venue homepage 501, a prototypical top-level programming control point in website design, the attendee client global searches and control program instructions 500 provide a wide array of search entry points into the virtual convention venue databases 300 and dive-down/branch control to additional program instructions as depicted in FIG. 5. The term "dive down/branch control" refers to the capability of the program to execute a portion of the program instructions in response to a user selection choice, and to the configuration of the program so that smaller portions so executed are nested within larger portions so executed. The attendee client 101 has several major selection choices with follow-up database query and page display processing including: convention selection 505, association selection 510, conference search 515, events search 520, trade show search 525, cyber exhibits 530, sessions and forums 535, or convention and visitor bureau ("CVB") host sponsors 540. Each of these programmed selection choices has special search and database list or follow-on processing capabilities.

The convention selection 505 program instructions process provides query search options of the virtual convention venue databases 300 and resultant pathway(s) to the appropriate convention welcome page display. These program instructions are directed to either or both of cyber conventions 600 and venue based and cyber conventions 700. Query options include a search of all convention events. In this case, "conventions" include all conventions, events, conferences and trade shows by (and including combinations) of name, association name, geographic location, event dates, convention themes or session subjects in the databases. To provide further insight to the convention selection 505 database query and page display process, the following search questions examples result in lists of convention records which can lead the attendee client 101 to appropriate convention welcome pages profession related examples are used where appropriate.

Example No. 1

By Convention Name Search Example

Query What are the upcoming "bar association" conventions? Response This query results in a list of all conventions with the words "bar association" including "American Bar Association Meeting on Litigation", "American Bar Association Annual Meeting", and "Pittsburgh Bar Association Contracts Forum". Link to the appropriate convention welcome page can be made from the resulting list.

Example No. 2

By Geographic Location Search Example

Query What conventions are being held in Orlando (city), or Florida (state or province)? Response This query results in a list of all Orlando conventions. Sub-queries What upcoming "bar association" conventions are being held in "Orlando"? What upcoming "bar association" conventions are being held with The Web 104 being the geographic location? What "bar association" conventions are being held "on The Web" at the virtual convention venue invention? Response These queries result in lists of all "bar association" conventions being held in Orlando or only on The Web 104.

Example No. 3

By Event Dates (in Combination) Search Example

Query I have an extra couple of days, Jul. 15, 1999 through Jul. 19, 1999 in Orlando; what "bar association" meetings are going on? Event dates is also used in the compound database query and page display.

Example No. 4

By Convention Theme Search Example

Query What are the upcoming "bar association" conventions on "intellectual property"? The convention or theme is also used in the database query.

Example No. 5

By Session Subjects Search Example

Query What conventions have sessions and forums on "software contract writing"? The session and forums keywords are used to list the conventions.

The association selection 510 program instructions process provides query search options of the virtual convention venue databases 300 and resultant pathway(s) to the appropriate convention welcome page display, again in terms of either the 100% cyber-based convention 600 or the venue-with-cyber convention 700 from the association database entry point. Query options exemplified in the following examples include a search of all conventions. Again "conventions" includes all conventions, events, conferences and trade shows by (and including combinations) of association name, acronym or association subject.

Example No. 7

By Association Name Search Example

Query What are the upcoming "bar association" conventions? Response This query results in a list of all associations with the words "bar association" including "American Bar Association" and "Pittsburgh Bar Association". From this view, the attendee client 101 can next view all conventions for a specific association. Link to the appropriate convention welcome page can be made from the final list.

Example No. 8

By Association Acronym Search Example

Query What are the upcoming "ABA" conventions? Response This query will first list the associations with the acronym of "ABA" including "American Bar Association", "American Beauty Association", "American Bankers Association", and "Association for Behavior Analysis". Link to the appropriate convention welcome page can be made from the final list.

Example No. 9

By Association Subjects Search Example

Query What are the upcoming "law" or "legal" conventions? Response This query results in a list of all associations with "law" or "legal" subject categories including "American Bar Association", "American College of Trial Lawyers", "American Society of Notaries" and "Trademark Society". From this view, the attendee client 101 can next view all conventions for a specific association. Link to the appropriate convention welcome page can be made from the final list.

A specific subset of the conventions industry is termed or identified as the "conference". The "conference" is typically a mission- or cause-oriented association sponsored meeting. An example of the "conference" convention is the Peace on Earth Conference held by the World Affairs Council of Washington. A "conference" may or may not have exhibitors.

Because certain attendee clients 101 are searching for a convention that has been termed or identified by the meeting planner client 102 as a "conference" or are specifically interested in a "conference", the invention provides a conference search 515 of the virtual conventions databases 300 of all conventions. In the virtual convention venue databases 300 "conventions" includes all conventions, events, conferences and trade shows, by (and including combinations) conference name, association name, geographic location, event dates, conference themes or session subjects. The conference search 515 program instructions process is identical to the convention selection 505 program instructions process control listed above with page direction or attendee client 101 word directions modified for "conference" and provides query search options of the database and resultant pathway(s) to the appropriate convention welcome page program instruction processes.

Particular conventions are termed or identified as an "event". The "event" is typically a specific topic-oriented corporate or association meeting, such as the "Xerox Top Sales Winners" event or the "Intellectual Property Writing Workshop" event hosted by the American Bar Association. An "event" may or may not have exhibitors.

Because certain attendee clients 101 are searching for a convention that has been termed or identified by the meeting planner client 102 as an "event" or are specifically interested in an "event", the invention provides an events search 520 of the virtual convention venue databases 300 of all conventions. In the virtual convention venue databases 300 "conventions" includes all conventions, events, conferences and trade shows, by (and including combinations) conference name, association name, geographic location, event dates, conference themes or session subjects. The events search 520 program instructions process is identical to the convention selection 505 program instructions process control listed above with page direction or attendee client 101 word directions modified for "event" and provides query search options of the database and resultant pathway(s) to the appropriate convention welcome page processes.

Yet another subset of the conventions industry is termed or identified as the "trade show". The "trade show" is typically a "trade" association- or organization-sponsored convention involving industry-related vendor exhibitor booths as a primary function of the convention. An example of the "trade show" convention is the Athletic Equipment Managers Show which would feature many vendor booths from the athletic sports equipment manufacturers industry.

Because certain attendee clients 101 are searching for a convention that has been termed or identified by the meeting planner client 102 as a "trade show" or are specifically interested in a "trade show", the invention provides a trade show search 525 of the virtual convention venue databases 300 of all conventions. In the virtual convention venue databases 300 "conventions" includes all conventions, events, conferences and trade shows, by (and including combinations) conference name, association name, geographic location, event dates, conference themes or session subjects. The trade show search 525 program instructions process is identical to the convention selection 505 program instructions process control listed above with page direction or attendee client 101 word directions modified for "trade show" and provides query search options of the database and resultant pathway(s) to the appropriate convention welcome page processes.

The cyber exhibits and cyber exhibit booth display 530 program instructions process provides query search options of the virtual convention venue databases 300 and resultant pathway(s) to the cyber exhibitor booths display program instructions process. A "cyber exhibit" or "cyber exhibit booth" is a unique web browser page display layout providing a show, demonstration or presentation of products and/or services made up of an open-ended number of common Internet advertising ad banner sizes arranged to appear similar to physical display booths used in the convention industry. The term "cyber" defines this overall display layout and viewing of the advertising ad banners from the virtual convention venue databases 300 accessed via the invention.

The "exhibits" or "exhibit booths" used in the invention are made up of "panels" illustrated in FIGS. 10A-10J. The panels may be common Internet advertising ad banner sizes such as full banner, full banner with vertical navigation bar, half banner, square banner, vertical banner, button #1, button #2, and micro button. Each panel can also represent a major display venue in which each panel can bridge the attendee client 101 to various promotional page venues such as the full exhibitor brochure, multiple and rotating digital photos of products, or video clips.

The cyber exhibits and cyber exhibit booth display 530 program instructions process provides query search options without the need to process the through a convention. At the attendee client 101 entry level, the search results are important and unique, bypassing the normal convention exhibit venue, because the booths listed for display are not "tied" to specific conventions. In simple terms, the cyber attendee client 101 is able to "make up" their own exhibition of booths from the virtual convention venue databases 300 based on the query options selected. Query options include a search of all cyber exhibit booths in the database as further explained in the following examples:

Example No. 10

By Exhibitor Name Search Example

Query Show me the "Nike®" cyber exhibit booths. Response The invention finds the Nike® Activewear booth (showing golf wear) from the National Golf Foundation Annual Convention in Chicago, finds another Nike® Activewear booth from the National Youth Sports Coaches Association Fall Meeting in Orlando, finds the Nike® Skates & Ice Hockey Equipment booth from the Ice Skating Institute of America Show in London, and finds the Nike® Basketball Shoes booth from the Athletic Equipment Managers Association convention being held totally/only on The Web 104 at the virtual convention venue 100. These cyber exhibit booths are displayed in a special Nike® exhibition for the attendee client 101.

Example No. 11

By Subject Search Example

Query Show me the "sporting goods" cyber exhibit booths. Response The invention searches the virtual convention venue databases 300 and finds the conventions and exhibitors with the subject category "sporting goods" and displays the booths for the attendee client 101. Cyber exhibit booths from conventions may include the National Golf Foundation or National Ski Retailers Association. Exhibitors may include Winchester® and Everlast®. The cyber exhibit booths are displayed in a special exhibition for the attendee client 101.

Example No. 12

By Key Word(s) Search Example

This search is much more restrictive than subject search directly above. Query Show me "ice hockey gloves". Response The invention finds only one—the Hockey Zone® cyber exhibit booth from the Ice Skating Institute of America Show in London and from the key words used by the exhibitor/sponsor client 103.

Example No. 13

By Convention Search Example

This databases search and program link control is special in that once a convention is selected, the attendee client 101 can go (after registration) directly to the booth displays of the selected convention. Query Show me the "bar association" convention booths. Response This query first results in a list of all conventions with booths with the words "bar association" including "American Bar Association Meeting on Litigation" and "American Bar Association Annual Meeting". Direct link (or links concatenating multiple conventions) is made to the convention-tied cyber exhibit booths—in this example showing TimeSlips® (the legal industry's time keeping and billing software), Crane® Stationery Co. (100% cotton bond engraved stationery) and ABC Mortgage Insurance (a mortgage insurance wholesaler to lawyers).

The sessions and forums 535 selection program instructions process provides query search options of the virtual convention venue databases 300 and resultant pathway(s) to cyber session 620 program instructions process or cyber forum 625 program instructions process of the 100% cyber-based convention 600 or to the sessions 720 program instructions process or forums 725 program instructions process of the venue-with-cyber convention 700. A "cyber session" or "cyber forum" is a unique 100% Internet-based session or forum application. A "venue-based session" or "venue-based forum" is a standard venue-based convention listing of sessions and forums.

Query options at sessions and forums 535 include a search of all session and forum records in the virtual convention venue databases for session and forum content. A sessions and forums search list is provided and appropriate programming link control. This is explained in the following examples:

Example No. 14

By Speaker Search Example

Query Are there any upcoming sessions or forums with "Alan Dershowitz"? Response ConventionNet database finds the session "The Blame Excuse by Professor Alan Dershowitz"; 10:00 am to 11:00 am; Jul. 15, 1999 at the "American Bar Association Annual Meeting" in Pittsburgh at the Hilton Convention Center. The invention also lists a "cyber forum" on "the Blame Excuse Defense" with Professor Alan Dershowitz hosted by the "American Bar Association Annual Meeting", 8:00 pm to 10:00 pm EST "on" or at the virtual convention venue.

Example No. 15

Query by Subject Search Example (e.g., "Legal Defense")

Example No. 16

Query by Date (e.g., Jul. 15, 1999)

Example No. 17

Query by Presenter—(e.g. "TimeSlips or American Bar Association")

The convention and visitor bureau host sponsors 540 selection program instructions process provides query search options of the virtual convention venue databases 300 and resultant pathway(s) to the appropriate convention welcome page display—appropriate in terms of either a 100% cyber-based convention 600 or a venue-with-cyber convention 700. Convention and Visitor Bureaus ("CVBs") are often major "hosts" of large conventions in their respective destinations. For example, the Greater Pittsburgh Convention & Visitors Bureau hosts the "American Bar Association Annual Meeting" and assists with various meeting arrangements. In the virtual convention venue databases 300, relational ties are made to CVB host sponsors, if applicable.

The association level direct entry 550 program instructions process defines a direct path for a specific convention for a participating association. In this way the meeting planner of the association can advertise a direct web address to the official convention welcome page for the convention. In other words, this process is designed to go around the "query search" front-end process, because the attendee client 101 is directed right to a specific convention. For example, "americanbar.conventionnet.com" can be defined in the invention by webmaster direct programming and the attendee clients 101 can be directed (by advertising or by a link from the participating association) or "started" at the specific or official convention welcome page of the American Bar Association Annual Convention.

The past attendee direct entry from interest profiler alert generation control 560 provides a program-generated alerting via standard Internet electronic mail systems to "past" attendee clients 101, about new conventions on the virtual convention venue system 100. The program instructions 400 tracks interests of the attendee clients 101 at various points—during cyber exhibits registration, during convention registration, just visiting a booth, attending a session or participating in a forum. This interest tracking is termed the "interest profiler". The invention periodically checks through a batch processing function the past "attendee interest profile" against new conventions, sessions, forums and exhibit booth "themes", "subjects" and "key words", and generates electronic mail to the past attendee to now visit the virtual convention venue system 100—with appropriate matched approaches to link or direct the past attendee to the correct level or record in the virtual convention venue databases 300—the convention, session, forum or exhibit booth. Optionally, other batch functions accumulate numerical information and generate numerical and statistical reports from the virtual convention venue databases 300. The batch processing programming functions, operating in the background of the central website server 200, are not depicted on the sitemap flow diagrams shown in FIGS. 5 through 9.

Figure 6:
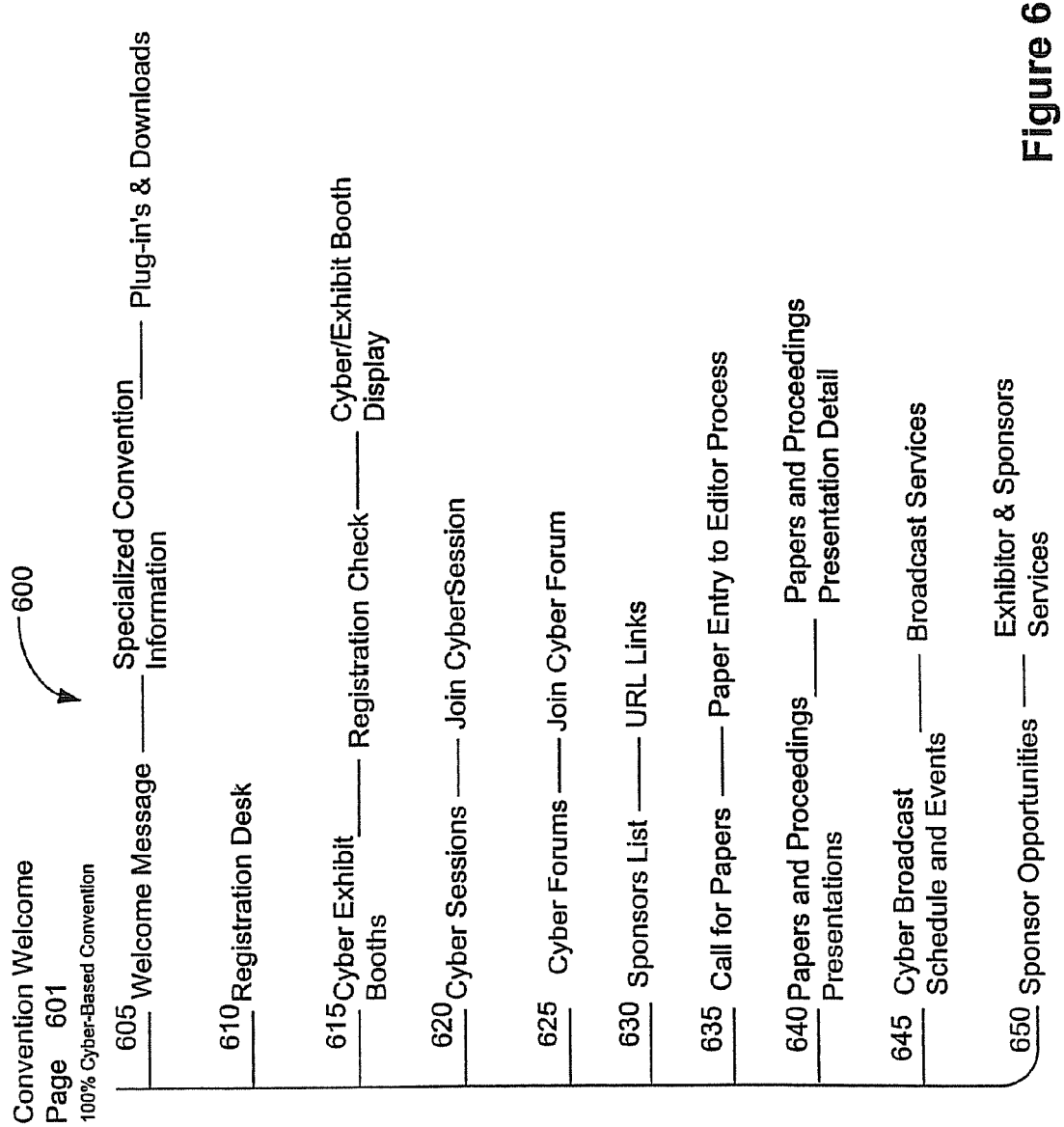
FIG. 6 illustrates a sitemap flow diagram of the cyber conventions with cyber exhibit booth display, and cyber sessions and forums—program instructions in accordance with this invention.

FIG. 6 illustrates a sitemap flow diagram of options available through the cyber conventions program instructions 600 in accordance with one embodiment of the invention. In the above discussion of FIG. 5, the title of this programming area was simplified and shortened to "100% cyber-based convention 600". It is important to again note that this programming control section 600, in terms of programming and displays, is only used if the convention is only 100% cyber-based.

From the convention welcome page 601, the 100% cyber-based convention 600 program instructions provide a wide array of processing using the virtual convention venue databases 300 to simulate attendance at a specific convention. The cyber convention is specific and defined. "Dive down" or sub-processing within this section is limited to the specific convention (e.g., "American Bar Association Meeting on Litigation", "American Bar Association Annual Meeting", or "Pittsburgh Bar Association Contracts Forum"). The attendee client 101 has several major selection choices with follow-up database query and page display processing including a convention welcome message 605, registration desk 610, cyber/exhibit booths 615 with display, cyber sessions 620, cyber forums 625, sponsors list 630, call for papers 635, papers and proceedings presentations 640, cyber broadcast schedule and events 645, and sponsor opportunities 650. Each of these programmed selection choices has special search and database list, dive-down program flow control, web page display or follow-on processing capabilities as further described below.

The welcome message 605 program instructions displays from the virtual convention venue databases 300 the specific convention overview information such as and including a director message, welcome information, overall dates of the meeting, and meeting theme. The specific convention information would have already been set up or entered in the invention by the meeting planner client 102 through meeting planner client support—program instructions 800 (described below). Dive-down program flow control is provided to specialized convention information such as common web browser program "plug-ins and downloads" (e.g., IPIX™, RealPlayer™) needed to assist in supporting the display and programming of the cyber convention, the cyber sessions or forums, cyber broadcast events, or cyber exhibit booth displays.

The registration desk 610 program instructions directs the attendee client 101 to register for services of the specific convention. Based on registration policies and fee amounts and other registration control parameters contained in the virtual convention venue databases 300 (set up or loaded by the meeting planner client 102 in meeting planner client support—program instructions 800) the attendee client 101 follows the program flow control and web page display instructions. The program processes the registration information obtained from the attendee client 101. For example, cyber exhibit booth display 615 "attendance" may be "free" or the attendee client 101 can pay via a credit card or other Internet common payment approaches. Similarly, registration policies and fee amounts with program flow control can affect "attendance" at cyber sessions 620, cyber forums 625, cyber broadcast events 645, or other areas as program controlled by the registration policies and fee amount fields.

During the registration desk 610 program control, the attendee client 101 also provides interest profile information that is used in later batch processing from the past attendee direct entry from interest profiler alert generation control 560.

Registration information is also provided to exhibitors and sponsor clients 102 enabling them to seek follow-up sales with the attendee client 101. This information transfer may or may not be made known to the attendee client 101.

The cyber exhibit booths 615 program control and page displays lists of the cyber exhibit booths and allows the attendee client 101 to "visit" the booths. A registration check is made to assure attendee client 101 access to the booths; if not, branch control is provided back to the registration desk 610. The cyber exhibit detail and booth control and page displays lists the cyber exhibit booths and allows the cyber attendee to "visit" the booths. Search by various options is provided. The search options include a search of only the cyber exhibit booths in the virtual convention venue databases 300 relationship-tied to the specific convention. Options include search by exhibitor name such as the "Nike®" exhibit booths at this convention, by subject search such as the "sporting goods" exhibit booths at this convention, or by key word(s) such as "ice hockey gloves" at this convention.

As noted before, the "exhibits" or "exhibit booths" used in the invention are made up of "panels" as illustrated in FIGS. 10A-10J. The panels are the common Internet advertising ad banner sizes such as full banner, full banner with vertical navigation bar, half banner, square banner, vertical banner, button #1, button #2, and micro button. Each panel can also represent a major display venue—where each panel can bridge the attendee client 101 to various promotional page venues (e.g., the full exhibitor brochure, multiple and rotating digital photos of products, or video clips). The attendee client 101 can click on any and all panels.

| Size (Pixels) | Size (Inches) | Type |
| --- | --- | --- |
| 468 × 60 | 6.50 × 0.83 | Full Banner |
| 392 × 72 | 5.44 × 1.00 | Full Banner with Vertical Navigation Bar |
| 234 × 60 | 3.25 × 0.83 | Half Banner |
| 125 × 125 | 1.74 × 1.74 | Square Banner |
| 120 × 90 | 1.67 × 1.25 | Button #1 |
| 120 × 60 | 1.67 × 0.83 | Button #2 |
| 88 × 31 | 1.22 × 0.43 | Micro Button |
| 120 × 240 | 1.67 × 3.33 | Vertical Banner |

Advertising industry standard ABC and BPA International audit measurement is tracked in the virtual convention venue databases 300 concerning attendee client 101 visits at the booth or click-throughs from the panels for later reporting to the exhibitor/sponsor client 103, or for billing purposes. Fees and policies concerning the attendee client 101 visit measurement and billing of the exhibitor/sponsor client 103 can be set up by the meeting planner client 102 in meeting planner client support—program instructions 800.

The cyber sessions 620 and cyber forums 625 program control and page displays list the cyber sessions or forums and allows the attendee client 101 to "join". A registration check is made to assure proper access, based on registration policies and fees set up by the meeting planner client 102. These cyber sessions and forums are specific to the convention, and are associated with the respective convention in the database. The sessions and forums are set up or loaded into the invention virtual convention venue databases 300 by the meeting planner client 102 in meeting planner client support—program instructions 800 further described below.

For the cyber sessions and forums, interactive processing or participation by the attendee client 101 is provided with a common join-the-forum Internet chat-room-type control with "subject" word categories or specific subject areas, with or without time attendance schedules. Also, the interactive processing or participation by the attendee client 101 to join-the-session/forum common Internet video conferencing with specific subject areas and time attendance schedules can be provided. An example of "cyber forum" is "The Blame Excuse Defense" with Professor Alan Dershowitz hosted by the "American Bar Association Annual Meeting", 8:00 pm to 10:00 pm EST. The attendee client 101 is invited to join in.

The sponsors list 630 program control and page displays lists the special sponsors of the convention. These sponsors are specific to the convention, and are related/tied in the virtual convention venue databases 300. The sponsors can be set up or loaded by the meeting planner client 102 in meeting planner client support—program instructions 800.

In the conventions industry, the sponsors are usually "higher up" than exhibitors with their underwriting activities of the convention. This usually means sponsors receive greater exposure than exhibitors and receive the best cyber exhibit booth size and location. Therefore, the cyber exhibit booths 615 display process would take the sponsor designation in the virtual convention venue databases 300 as priority control in terms of all booth list sequences. Further, in sponsors list 630, special advertising with URL links would be provided in this page display area.

For medical or technical conventions, the call for papers 635 program control and page displays provides the attendee client 101 a process to submit a "technical paper" for consideration by the editorial professionals of the association which would be the meeting planner client 102. The "paper", once placed in the virtual convention venue databases 300, can be a wide arrange of common Internet electronic presentations including multimedia information such as video, movies, photographs, and audio.

Logging of the "technical paper" and transfer processing is provided to the appropriate editorial review professional, a specific meeting planner client 102, of the association. The call for papers 635 program control parameter rules is set up in the invention by the meeting planner client 102 in meeting planner client support—program instructions 800.

Subsequent to the call for papers 635 processing, the papers and proceedings presentations 640 program control and page displays provides the attendee client 101 a process to select and list "technical/professional papers" for review that have been accepted by the editorial professionals of the association, a special type of meeting planner client 102. Further, the official proceedings of the convention are "posted" or placed in the papers presentations and proceedings database 380 by the meeting planner client 102 for subsequent releasing to the attendee client 101.

The cyber broadcast schedule and events 645 program control and page displays list the Internet broadcasts and provides further procession for allowing the attendee client 101 to "sign up". A registration check is made to assure proper access, based on registration policies and fees set up by the meeting planner client 102. These cyber broadcasts use common Internet broadcast technology, however the broadcasts are specific in the invention in terms of a tie or relationship to the specific convention in the virtual convention venue databases 300. Fees and policies concerning the attendee client 101 participation or viewing the cyber broadcast can be set up by the meeting planner client 102 in meeting planner client support—program instructions 800.

An example of the "cyber broadcast" is "The Blame Excuse Defense" with Professor Alan Dershowitz hosted by the "American Bar Association Annual Meeting", 8:00 pm to 10:00 pm EST. In this case, Professor Dershowitz presents a speech only program.

The sponsor opportunities 650 program control and page display links and branches the attendee client 101 to the exhibitor/sponsor client support—program instructions 900. The control is passed in the system with referral from the sending-specific convention including information provided by the attendee client 101 during the registration process. This process gives the attendee client 101, who may now automatically become an exhibitor/sponsor client 103, an opportunity "sign up" as an exhibitor or sponsor to the specific convention in the virtual convention venue databases 300.

Figure 7A:
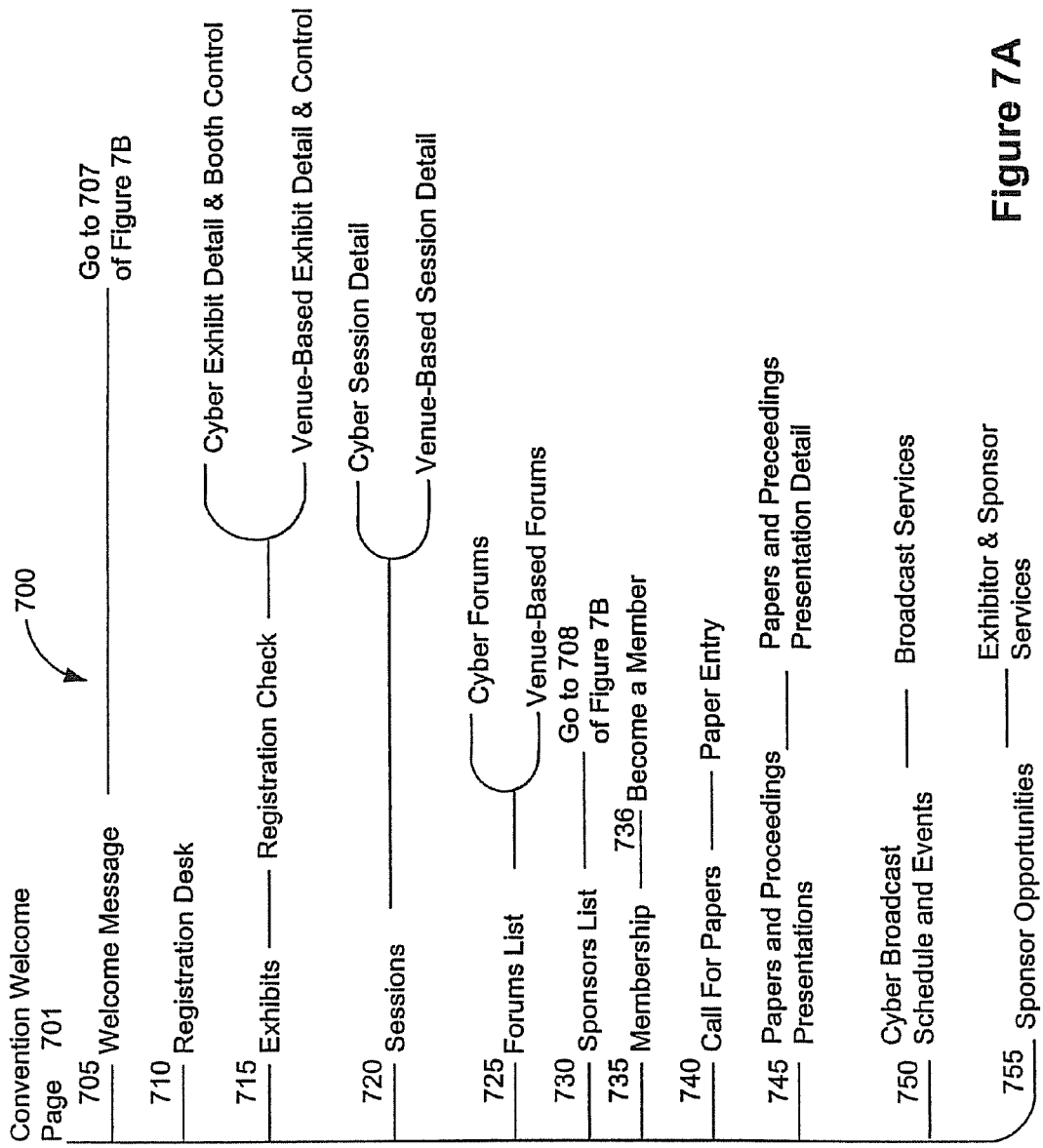
FIGS. 7A-7B illustrate a sitemap flow diagram of venue-based conventions WITH cyber conventions with cyber exhibit booth display, and cyber sessions and forums—program instructions in accordance with this invention.
Figure 7B:
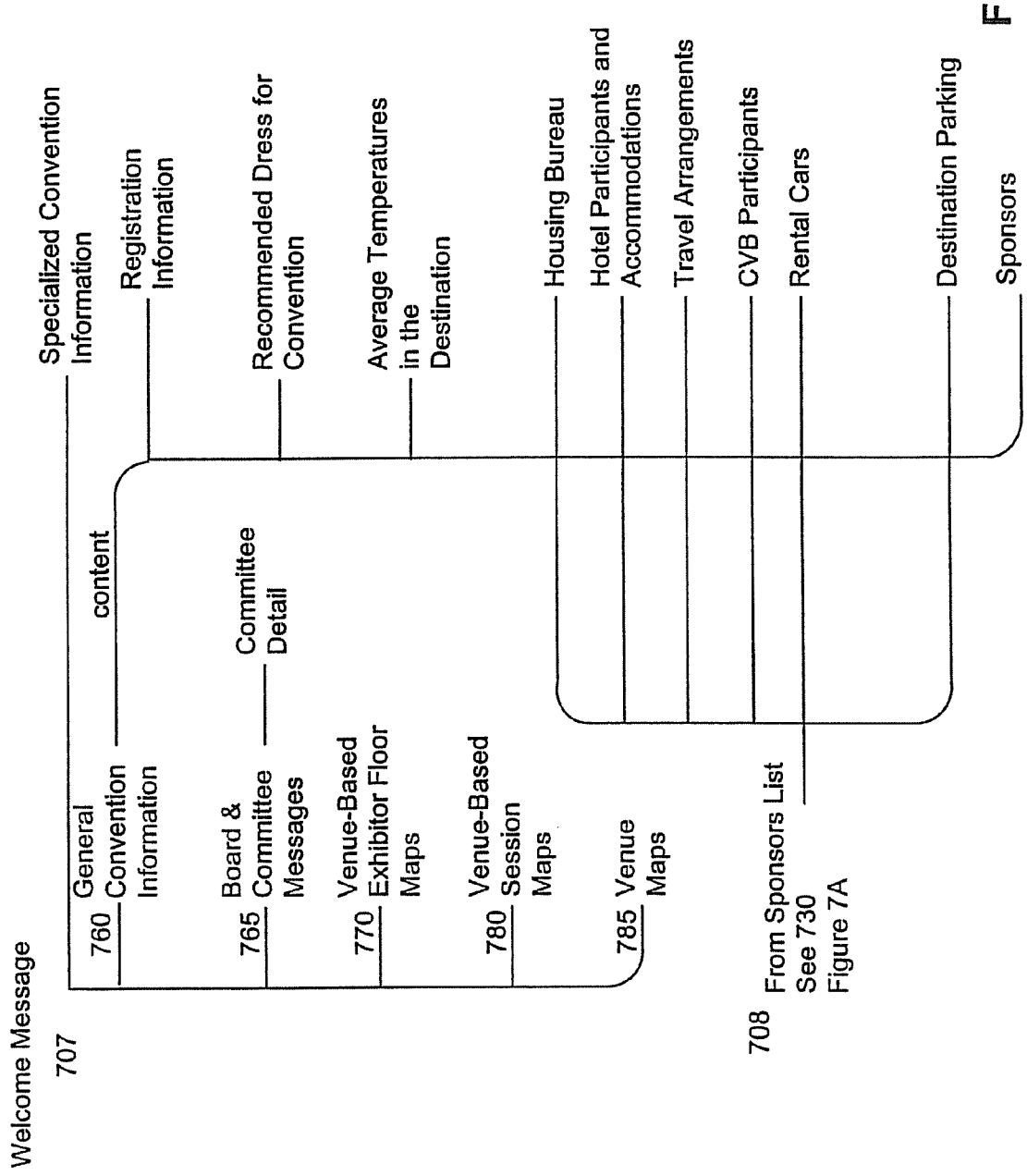

FIGS. 7A and 7B illustrate a sitemap flow diagram of venue-based conventions with cyber conventions with cyber exhibit booth display, and cyber sessions and forums—program instructions 700 in accordance with one embodiment of the invention. In the above discussion of FIG. 5, the title of this programming area was simplified and shortened to "venue-with-cyber convention 700". The invention now allows the visitation by the attendee client 101 of a cyber-based convention that is available anytime before, during, or after a venue-based convention (e.g., Moscone Center in San Francisco). The attendee client 101 now has a wide array of specific convention information provided and activity simulated through the program instructions and the databases. It is important to again note that this programming control section, in terms of programming and displays, is only used IF there is joining or combinations of a venue-based conventions WITH cyber conventions. This provides all parties involved the ability to register and attend the venue-based convention AND/OR the cyber convention.

From the convention welcome page 701, the venue-with-cyber convention 700 program instructions provide a wide array of processing using the virtual convention venue databases 300. The convention in this programming control section is again specific and defined. "Dive down" or sub-processing within this section is limited to the specific convention (e.g., "American Bar Association Annual Meeting on Litigation held at the Moscone Center in San Francisco) using this virtual convention venue, the attendee client 101 has several major selection choices with follow-up database query and page display processing including a convention welcome message 705, registration desk 710, exhibits 715 with display, sessions 720, forums list 725, sponsors list 730, membership 735, call for papers 740, papers and proceedings presentations 745, cyber broadcast schedule and events 750, and sponsor opportunities 755. Each of these programmed selection choices has special search and database lists, dive-down program flow control, web page display or follow-on processing capabilities as further described below.

The welcome message 705 program instructions displays from the virtual convention databases 300 the specific convention overview information such as and including a director message, welcome information, overall dates of the meeting, meeting theme, as well as venue-based convention information. The welcome message 705 logically expands to point 707 on FIG. 7B to depict the expanded role of the welcome message 705. The welcome message 705 program instructions displays from the virtual convention venue databases 300. The specific convention information would have already been set up or entered in the invention by the meeting planner client 102 through meeting planner client support—program instructions 800 (described below). Dive-down program flow control is provided to specialized convention information such as common web browser program "plug-ins & downloads" needed to assist in supporting the display and programming of the cyber convention, the cyber sessions or forums, cyber broadcast events, or cyber exhibit booth displays. Venue-based information programming on FIG. 7B includes general convention information 760, board and committee messages 765, venue-based exhibitor floor maps 770, venue-based session maps 780, and venue maps 785.

The general convention information 760 program instructions provides the attendee client 101 extensive content-type data from the virtual convention venue databases 300. This programming and content information and includes registration information and program link control, recommended dress for the venue-based convention, average temperatures at the venue-based destination, housing bureau involvement and program link control with URL links, hotel participants and accommodations with URL links, travel arrangements with URL links, CVB participants with URL links, rental car transportation with URL links, venue-based destination parking with URL links, and sponsors with URL links.

The board and committee messages 765 program instructions provide for special welcome and direction information for boards and committees of the association and organization involved in the convention.

The venue-based exhibitor floor maps 770 program instructions provide floor maps of the exhibitors (e.g., Moscone Center main floor with the layout and location of exhibitors). Exhibitor name search list processing is provided in the invention showing the location of a specific exhibitor booth on the floor.

The venue-based session maps 780 program instructions provide floor maps of the sessions and forums (e.g., Moscone Center "break out" rooms for the location of the sessions and forums). Session and forum name search list processing is provided showing the location of a specific session or forum in a break out room.

The venue maps 785 program instructions provide maps of the venue, such as the Moscone Center in San Francisco. Sponsors involved who are physically located around or outside the venue can provide location information; and, sponsor name or service type search list processing is provided showing the location of a specific sponsor (e.g., the Hyatt Hotel two blocks from the Moscone Center).

Returning to FIG. 7A, the registration desk 710 program instructions directs the attendee client 101 to register for services of the cyber OR venue-based convention. Based on registration policies and fee amounts contained in the convention venue databases 300 which are set up or loaded by the meeting planner client 102 in meeting planner client support—program instructions 800, the attendee client 101 follows the program flow control and web page display instructions. For example, cyber exhibit booth display 7150R the venue-based center "attendance" may be "free" or the attendee client 101 can pay via a credit card or other Internet common payment approaches. Similarly, registration policies and fee amounts with program flow control can affect "attendance" at sessions 720, (in either cyber sessions or venue-based sessions, forums 625, in either cyber or venue-based sessions, or other convention areas as program controlled by the registration policies and fee amount fields.

During the registration desk 710 program control, the attendee client 101 also provides interest profile information that is used in later batch processing from the past attendee direct entry from interest profiler alert generation control 560.

The exhibits 715 program control and page displays directs the attendee client 101 to the cyber exhibit detail and booth control OR the venue-based exhibit detail and control. The exhibits 715 program control and page displays lists of the cyber exhibit booths and allows the attendee client 101 to "visit" the booths similar to the cyber exhibit booths 615 processing above. A registration check is made to assure attendee client 101 access to the booths, in the alternative, if not, branch control is provided back to the registration desk 610. The cyber exhibit detail and booth control and page displays lists the cyber exhibit booths and allows the attendee client 101 to "visit" the booths. Search by various options is provided. The search options include a search of only the cyber exhibit booths in the virtual convention venue databases 300 relationship-tied to the specific convention. Options include search by exhibitor name such as the "Nike®" exhibit booths at this convention, by subject search such as the "sporting goods" exhibit booths at this convention, or by key word(s) such as "ice hockey gloves" at this convention.

However, in this exhibits 715 program control and page displays area, the venue-based exhibit detail is also displayed from the virtual convention venue databases 300. This allows the attendee client 101 to search and list the various exhibitors at the venue-based convention such as the "sporting goods" exhibitors at the Moscone Center at the venue-based convention. Program link control is provided from the venue-based exhibit detail and control to the venue-based exhibitor floor maps 770.

The sessions 720 and forums 725 program control and page displays list the cyber and venue-based sessions or forums and allows the attendee client 101 to "join". A registration check is made to assure proper access, based on registration policies and fees set up by the meeting planner client 102. These cyber and venue-based sessions and forums are specific to the convention, and are related/tied in the database. The sessions and forums are set up or loaded into the invention virtual convention venue databases 300 by the meeting planner client 102 in meeting planner client support—program instructions 800 further described below. The sessions 720 and forums 725 program control for the cyber sessions and forums is the same as described in the above cyber sessions 620 and cyber forums 625 program control and page displays. The venue-based sessions or forums detail and control processing allows the attendee client 101 to also search and list the various sessions or forums presented at the venue-based convention. Registration branch program control is provided.

The sponsors list 730 is similar to the above described sponsors list 630 program control and page displays lists of the special sponsors of the convention. These sponsors are specific to the convention, and are related/tied in the virtual convention venue databases 300. The sponsors are set up or loaded by the meeting planner client 102 in meeting planner client support-program instructions 800. The sponsors list 730 processing includes venue-based sponsor information and program processing which is link-depicted at 708 on FIG. 7B-*linking* to the general convention information 760 program control.

The membership 735 program control and page display directs the attendee client 101 to "join" the association that is holding the specific convention. A wide selection of association membership-type information from the virtual convention venue databases 300 is provided. Become a member 736 program control and processing is similar to the registration desk 610 program; links are provided. Membership fees and policies concerning the attendee client 101 joining the association is set up by the meeting planner client 102 in meeting planner client support—program instructions 800.

The call for papers 740 and subsequent papers and proceedings presentations 745 program control and page displays are identical to the processing described in detail above in call for papers 635 and papers and proceedings presentations 640. However, the "technical paper" presented by the professional, attendee client 101, can also be viewed by the editorial committee for potential presentation at the venue-based convention. Also, the "proceedings" of the venue-based convention can be "posted" by the meeting planner client 102.

The cyber broadcast schedule and events 750 program control is identical to the processing described in detail above in cyber broadcast schedule and events 645 and is depicted here to show the inclusion with the "venue-with-cyber convention 700".

The sponsor opportunities 755 program control is identical to the processing described in detail above in sponsor opportunities 650, and is depicted here to show the inclusion with the "venue-with-cyber convention 700".

Figure 8:
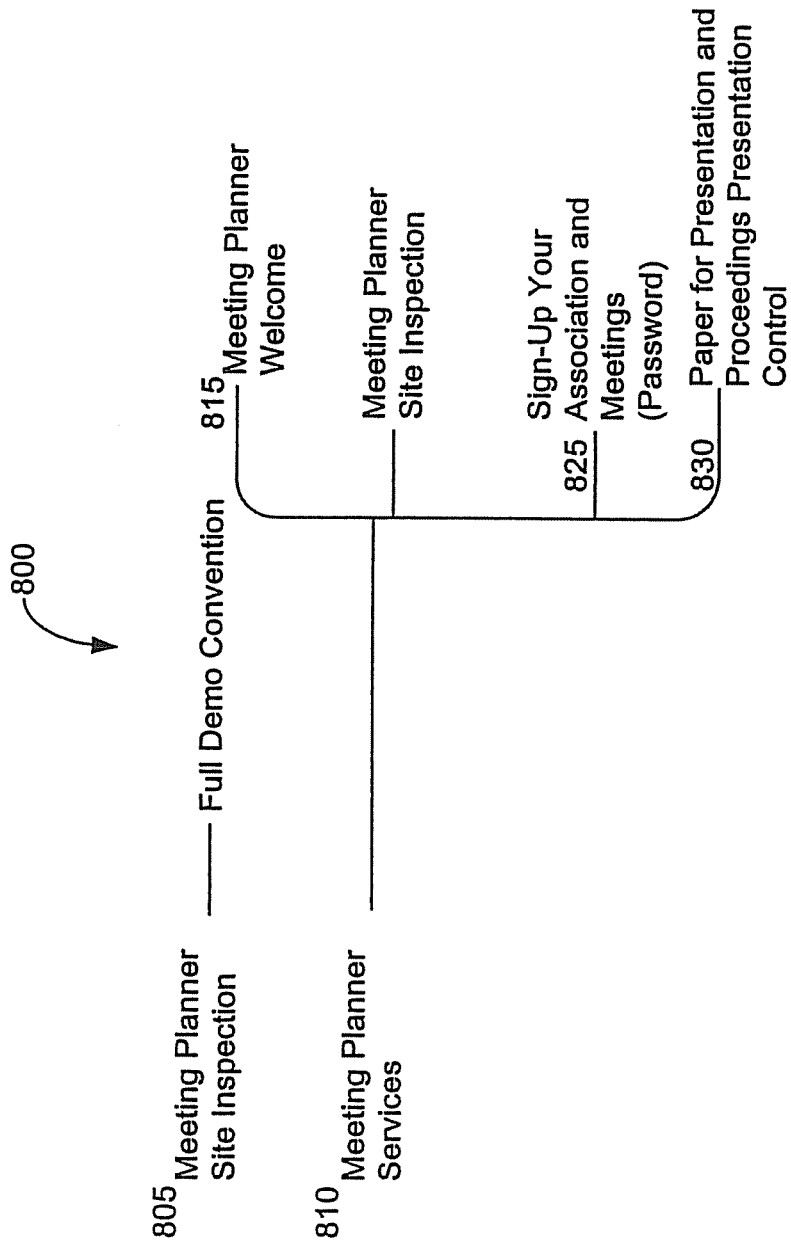
FIG. 8 illustrates a sitemap flow diagram of the meeting planner client support—program instructions in accordance with this invention.

FIG. 8 illustrates a sitemap flow diagram of the meeting planner client support-program instructions 800 in accordance with one embodiment of the invention. The system now allows the prospective meeting planner client 102 to review a sales demonstration of a fully loaded "showcase sample" virtual convention. The system then provides the meeting planner client 102 the dive-down program flow control to initially load and later change the control parameter rules and content information into the virtual convention venue databases 300 for each specific convention. The parameter rules and content information supports the "100% cyber-based convention 600", the "venue-with-cyber convention 700", and the fees and policies used in the exhibitor/sponsor client support—program instructions 900.

Similar to the meetings for professional work with physical convention centers (e.g., venue-based centers) in the convention industry, the meeting planner client 102 has significant control of specific "conventions" (e.g., standard conventions, events, conferences, trade shows and meetings) in the virtual convention venue invention. Further interpretation on meeting planners work can be obtained from Meeting Professionals International "MPI" located in Dallas, Tex. The meeting planner client support—program instructions 800 in terms of the meeting planner client 102 was described in the FIG. 6 detail discussions above: welcome message 605, registration desk 610, cyber exhibit booths 615, cyber sessions 620, cyber forums 625, sponsors list 630, call for papers 635, papers and proceedings presentations 640, and cyber broadcast schedule and events 645. Further, the meeting planner client support-program instructions 800 in terms of the meeting planner client 102 was also described in the FIGS. 7A and 7B detail discussions above: welcome message 705, registration desk 710, exhibits 715, sessions 720, forums 725, sponsors list 730, membership 735, call for papers 740, papers and proceedings presentations 745, cyber broadcast schedule and events 750, general convention information 760, board and committee messages 765, venue-based exhibitor floor maps 770, venue-based session maps 780, and venue maps 785.

The meeting planner site inspection 805 program instructions process provides controlled query of the virtual convention venue databases 300 and allows the prospective meeting planner client 102 to review a sales demonstration of fully loaded samples of virtual conventions. These samples include meetings and conventions from both the "100% cyber-based convention 600" and the "venue-with-cyber convention 700" program processes.

The meeting planner services 810 program instructions provides the meeting planner client 102 the dive-down program flow control to initially load and later change the control parameter rules and content information into the virtual convention venue databases 300 for each specific convention. The meeting planner services 810 program instructions address both the "100% cyber-based convention 600" and the "venue-with-cyber convention 700" control parameter rules and content information. A meeting planner welcome 815 program provides the various policies and fee options of the virtual convention venue processes. Next, a site inspection as described at point 805 above is provided if the prospect meeting planner client 102 missed such a "showcase" review of the invention.

The sign-up your association and meetings 825 program instructions provide all processing to initially load and later change the control parameter rules and content information into the virtual convention venue databases 300 for each specific convention. After a password is given by the webmaster, the meeting planner client 102 can contract pursuant to, for example, an agreement between the website host organization and the meeting planner association or corporation) for services on the virtual convention venue invention. The meeting planner client 102 can then load all details and content. The details and content are requested through a series of submission forms and subsequent receipt by the program including:
 convention processing flow control parameters,
 convention content information,
 exhibitor/sponsor registration edit criteria parameters,
 exhibitor client booth criteria and control parameters,
 attendee registration edit criteria parameters,
 sessions and forums processing flow control parameters,
 sessions and forums content information,
  call for papers processing flow control parameters,
 paper presentation content information,
 meeting proceedings content information,
  cyber broadcast processing flow control parameters, and
  broadcast schedule and event content information.

The meeting planner can also load potential exhibitor and sponsor contacts for further sales efforts by the website host organization.

The paper for presentation and proceedings presentation control 830 program instructions provide all processing for meeting planner clients 102 who are assigned specific technical editor responsibilities (by the association) for the paper review and approval for presentation. This program area includes review of all papers that have been submitted by attendee clients 101, post editor comments, and approval-marking the paper for inclusion in through the paper presentations 640 and 745 program instructions. Further, the meeting planner client 102 can also "post" or load on the paper presentations and proceedings database 380 the "official" proceedings of the convention.

Figure 9:
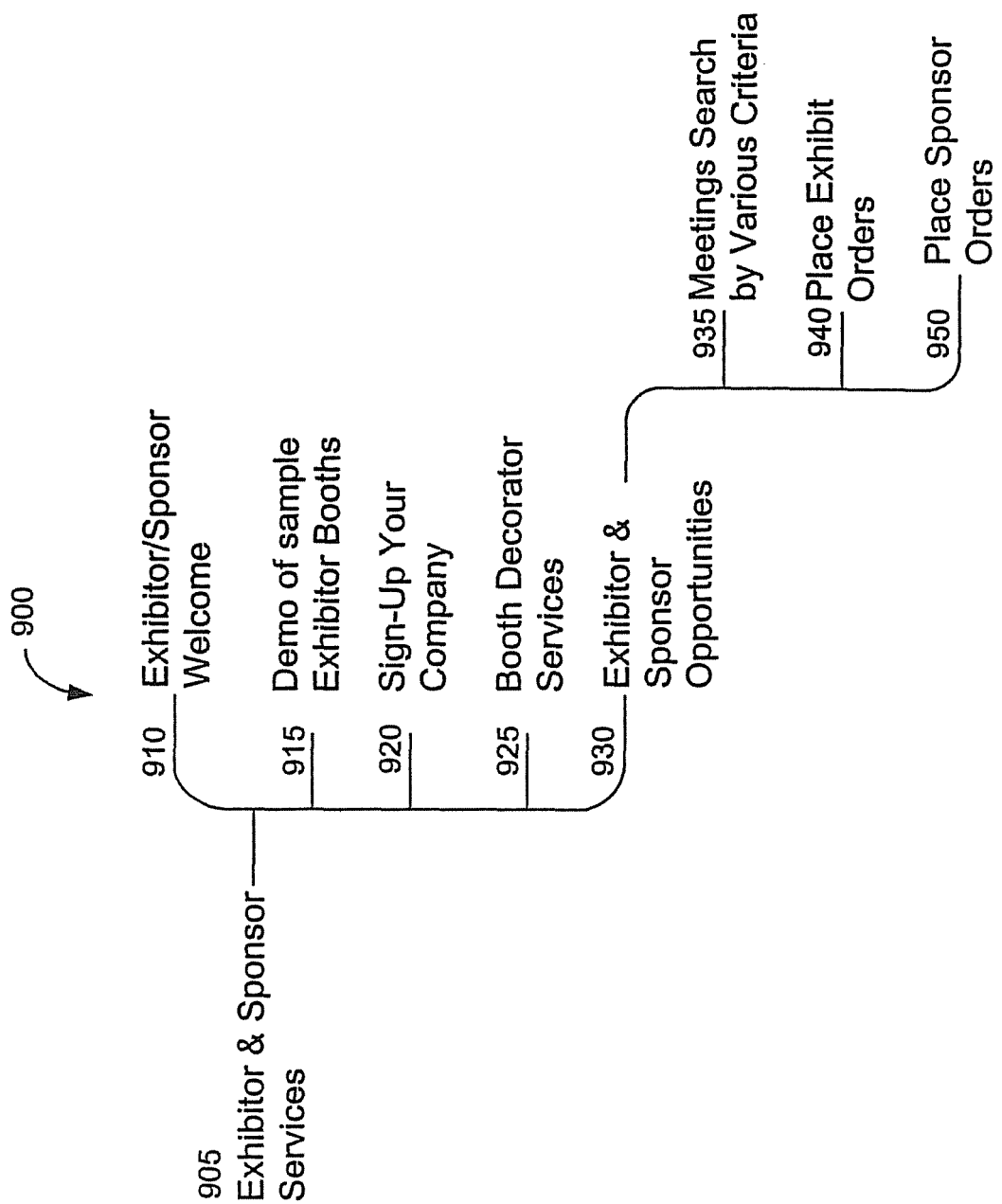
FIG. 9 illustrates a sitemap flow diagram of the exhibitor/sponsor client support—program instructions in accordance with this invention.
Figure 10A:
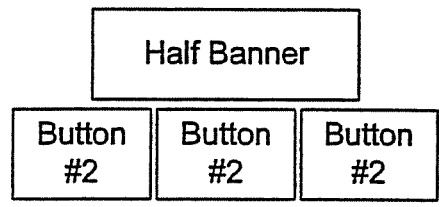
FIGS. 10A-10J illustrate 10 sample exhibit booth displays used in screen views and made from common Internet advertising ad banner sizes in accordance with this invention.
Figure 10B:
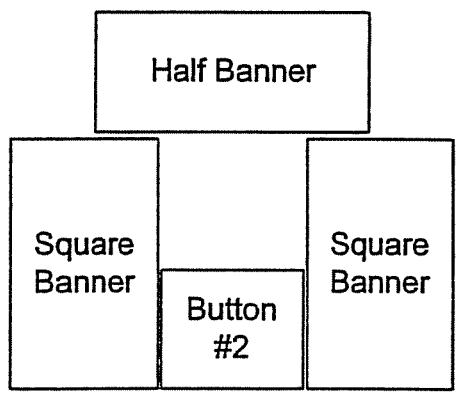
Figure 10C:
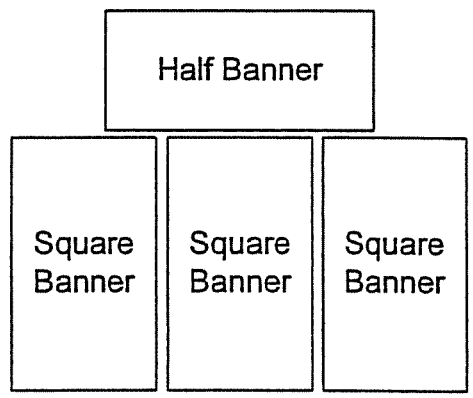
Figure 10D:
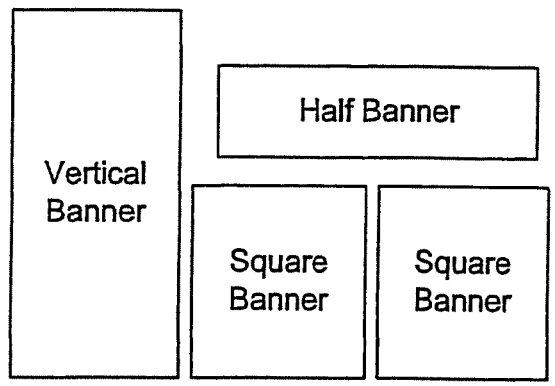
Figure 10E:
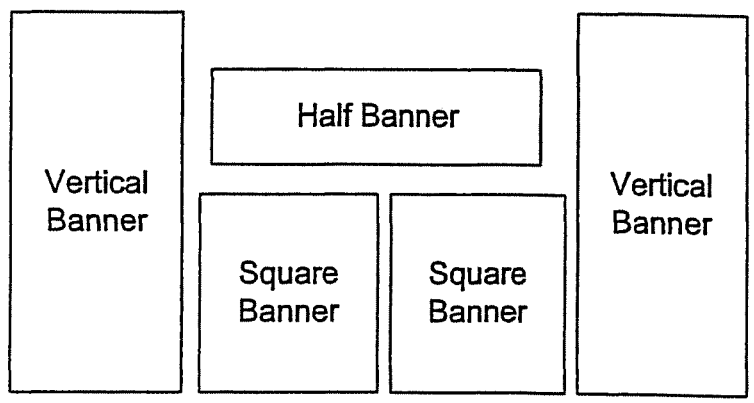
Figure 10F:
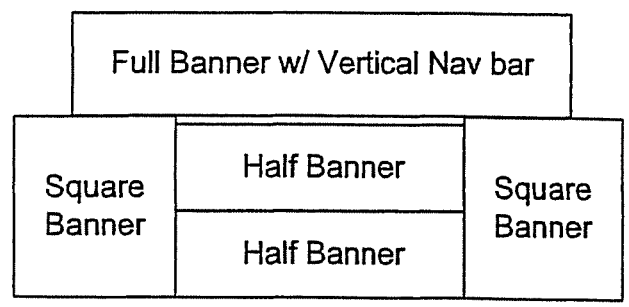
Figure 10G:
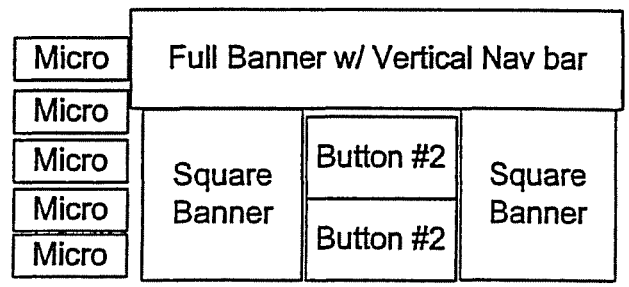
Figure 10H:
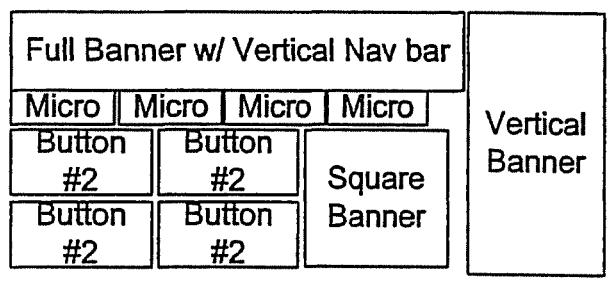
Figure 10I:
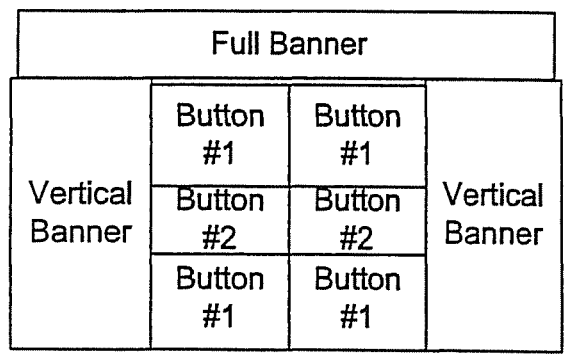
Figure 10J:
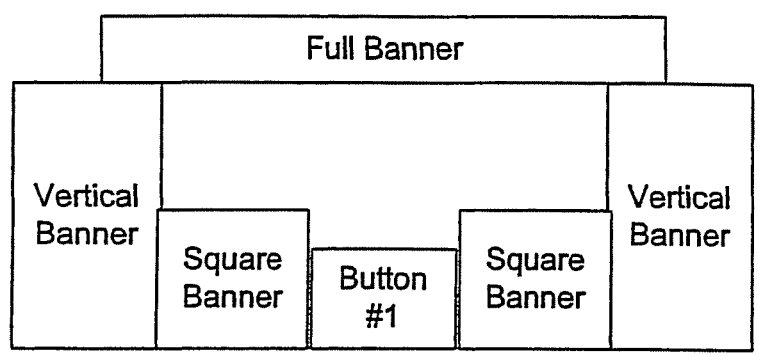

FIG. 9 illustrates a sitemap flow diagram of the exhibitor/sponsor client support—program instructions 900 in accordance with one embodiment of the invention. The exhibitor and sponsor services 905 program instructions now allow the prospective exhibitor/sponsor client 103 to review a sales demonstration of a fully loaded "showcase sample" of exhibitor booths. The system then provides the exhibitor/sponsor client 103 the dive-down program flow control to initially select and order the booth style, choose various decorator services, and then build the "panels", in FIGS. 10A-10J using common Internet advertising ad banner sizes and later change, using information provided by exhibitor/sponsor client 103, the exhibit booths and sponsor level support in the virtual convention venue databases 300 for one or many conventions. "One or many" is used here in the invention to specify the capability of the exhibitor/sponsor client 103 to place an exhibit booth order across multiple conventions in the virtual convention venue databases 300. This is further described below.

The exhibitor/sponsor welcome 910 program control and page displays provide the various policies and fee options associated to the potential exhibitor and sponsors of the virtual convention venue processes. The information presented to the exhibitor/sponsor client 103 in this programming area includes the policies and fees, such as sponsor level "packages", set forth in the virtual convention venue databases 300 for each selected meeting and convention.

The demonstration of sample exhibitor booths 915 program instructions presents a fully loaded "showcase sample" of exhibitor booths released to an exhibitor/sponsor on request. The standard styles illustrated in FIGS. 10A-10J are demonstrated as well as other styles used by exhibitors in the past.

The sign-up your company 920 program instructions provide all the form pages necessary for the exhibitor/sponsor client 103 to sign-up or register for specific conventions. Available here is an agreement between the website host organization representing the meeting planner association or corporation, and the exhibitor/sponsor for services on the virtual convention venue invention. Also, venue-based registration or sign-up processing is provided. All information is written in the virtual convention venue databases 300.

The booth decorator services 925 program instructions provide the capabilities to order the website host organization to assist with the technical aspects of the exhibitor booth. Decorator services is used here similar to the convention industry. The website host organization can offer a wide array of services such as digital photography, scanning, signage and other communication-type services to assist in assuring the exhibitor booth meets the needs of the exhibitor/sponsor client 103.

The exhibitor and sponsor opportunities 930 program instructions includes branch link control of the exhibitor/sponsor client 103 to meetings search by various criteria, place exhibit order dive-down process, or place sponsor orders.

The meetings search by various criteria 935 program instructions provide the exhibitor/sponsor client 103 the ability to "select" a specific convention OR "select" across multiple conventions. For example, exhibitor/sponsor "Pepsi-Cola Company" may want to exhibit and sponsor across all "sports" related conventions based upon terms in a master purchase agreement. Reiterating, a convention in the invention is defined as a standard convention, event, conference, trade show or meeting held at the virtual convention venue in terms of the programs and databases described herein.

The place exhibit orders 940 program instructions includes a "building process" of the exhibit booth and permits the exhibitor sponsor to provide booth design/content information. Programming steps include pick-a-booth, pick-a-show, pick-a-content-level, and pricing calculator with payment processing. The pricing of the exhibit booths is based on all of these criteria. As an example, a 25 page brochure behind one button on a cyber exhibit booth may be more expensive than one simple digital picture which requires less storage, because pricing may be content-based.

The place sponsor orders 950 program instructions provide the exhibitor/sponsor client 103 the ability to order and contract for special exposure services during the virtual convention venue processes. In the conventions industry, the sponsors are usually "higher up" than exhibitors with their underwriting activities of the convention. This usually means sponsors receive greater exposure than the exhibitors and receive the best cyber exhibit booth size, package deals, preferred locations, etc. This process area includes the various option controls, rotating welcome ad banners, session introduction advertising, and special recognition.

FIGS. 10A-10J illustrate 10 sample exhibit booth displays used in screen views and made from common Internet advertising ad banner sizes in accordance with this invention. The "exhibits" or "exhibit booths" used in the invention are made up of "panels" and arranged to appear similar to physical display booths used in the convention industry. The panels are the common Internet advertising ad banner sizes including full banner, full banner with vertical navigation bar, half banner, square banner, vertical banner, button #1, button #2, and micro button. Each panel can also represent a major display venue, where each panel can bridge the attendee client 101 to various promotional page venues such as the full exhibitor brochure, multiple and rotating digital photos of products, or video clips.

The attendee client 101 can click on any and all panels. Registration information is also provided to exhibitors and sponsor clients 103 enabling them to seek follow-up sales with the attendee client 101. This information may or may not be made known to the attendee client 101.

Because the common Internet advertising ad banner sizes are used, it is important to note that an open-ended number of booth styles can be made up. Also, advertising industry standard ABC and BPA International audit measurement is tracked in the virtual convention venue databases 300 concerning attendee client 101 visits at the booth or click-throughs from the panels for later reporting to the exhibitor/sponsor client 103, or for billing purposes. Fees and policies concerning the attendee client 101 visit measurement and billing of the exhibitor/sponsor client 103 can be set up by the meeting planner client 102 in meeting planner client support—program instructions 800.

CONCLUSION

The description of the invention set forth herein is illustrative, and does not limit the scope of the invention as set forth in the following claims. Variations and modifications of the embodiments disclosed herein are possible. For example, various web browser computer or "information appliance" types, various web browser software programs, various real-time communications protocols, various relational database systems, and various website programming languages may be used. Also, the programming method steps set forth are presented to the reader from a linear or sequential-explanation viewpoint for best understanding; in the invention the steps are quasi-reentrant (e.g., good website application programs are written to "start" almost anywhere). Finally, the various convention content and control parameter fields can have an unlimited number of programmer definitions and are also not meant to be limited. These and other variations and modifications of the embodiments disclosed herein may be made without departing from the spirit of the invention and from the scope of the invention as set forth in the following claims.

The invention claimed is:

1. A method for promoting awareness of products and services of an advertising sponsor during at least one online event, the method implemented on a central website system comprising a plurality of services accessible to a plurality of users over the Internet, the method comprising:
   a. in response to receiving input at the central website system from a first user, processing, building, designing, loading, controlling, formatting, and/or setting up at least one online event, wherein the at least one online event is associated with at least one interest;
   b. in response to receiving a selection of the at least one interest by an advertising sponsor, releasing a list of online events comprising the at least one online event;
   c. in response to receiving a selection of the at least one online event from the list of online events, processing, building, designing, loading, controlling, formatting, and/or setting up at least one advertising display associated with the advertising sponsor, the at least one advertising display comprising at least one of: a panel, a banner, a button, a link, a navigation bar, a click-on area, a display, a bridge, online content, multimedia content, an exhibit, a demonstration, a presentation, a brochure, a video, a movie, a photograph, a still image, an audio recording, or any combination thereof;
   d. providing a plurality of control parameters to the at least one advertising sponsor, and responsive to a selection of at least one control parameter by the advertising sponsor, electronically setting, loading, inputting, placing, designing, and/or controlling at least one of: i) a preferred presentation location of the at least one advertising display, ii) at least one exposure factor associated with the at least one advertising display, iii) a specified presentation frequency of the at least one advertising display, iv) a packaging arrangement associated with the at least one advertising display, v) at least one fee option associated with the at least one advertising display, vi) at least one recognition factor associated with the at least one advertising display, or any combination thereof;
   e. receiving, from at least one second user at the central website system, a search for at least one interest associated with the at least one online event;
   f. storing, in the database at the central website system, the at least one interest in the profile record associated with the at least one second user;
   g. facilitating, at the central website system, participation by the first user and the at least one second user in the at least one online event associated with the at least one interest;
   h. based at least partially on an association between the at least one interest and the at least one advertising display, processing the at least one advertising display at the central website system; and
   i. during the at least one online event, releasing, from the central website system, to at least one of the first user and the at least one second user, at least a portion of the at least one advertising display.

2. The method according to claim 1, wherein at least a portion of at least one of the at least one interest comprises content including at least one of: an interest, profile content, a product name, a service name, a brand name, a sponsor name, a personal name, in singular form, in plural form, a subject category, a theme, a subject, a keyword, a phrase, a formatted phrase, a proceeding, geographic location, medical content, audio content, video content, or any combination thereof.

3. The method of claim 1, wherein the first user and the at least one second user comprises at least one of: a social network, an association, a social group, a social circle, a group of users having a common interest, a plurality of network users, or any combination thereof.

4. The method according to claim 1, further comprising visually presenting or causing a visual presentation of, to the at least one second user, the geographic location on a map of the first user.

5. The method according to claim 1, further comprising processing, at the central website system, for the first user to limit access to at least a portion of new information associated with the at least one online event by users of the central website system.

6. The method according to claim 1, further comprising processing, at the central website system, at least one search of a database, wherein the search is at least partially based upon at least one of: an exact keyword search, a related subject category search, a phrase search comprising at least one keyword, a restrictive keyword, or any combination thereof.

7. The method according to claim 1, further comprising receiving from the first user and storing at least one interest in a profile record associated with the first user.

8. The method according to claim 1, further comprising tracking, at the central website system, at least one new interest of the at least one second user, which have viewed at least a portion of the at least one advertising display.

9. The method according to claim 1, further comprising tracking, at the central website system, at least one measurement associated with the at least one advertising display.

10. The method according to claim 1, wherein the at least one online event is related to or associated with at least one physical meeting.

11. The method according to claim 1, further comprising broadcasting, from the central website system, using at least one of an audio streaming technique and a video streaming technique, to at least one of the first user and the at least one second user.

12. The method according to claim 1, further comprising processing a selection of additional information to be displayed.

13. The method according to claim 1, further comprising displaying or causing the display of at least a portion of new information from the at least one online event to the at least one second user.

14. The method according to claim 1, further comprising processing, at the central website system, to associate the at least one online event to a time schedule.

15. The method according to claim 1, further comprising processing, at the central website system, to add at least one new user to at least one online event.

16. The method according to claim 1, wherein at least one of the first user and the at least one second user is at least one of: an attendee, a meeting planner, a sponsor, an exhibitor, an advertiser, a business, an organization, a person, an individual, a member, a professional, a participant, a travel provider, or any combination thereof.

17. The method according to claim 7, further comprising searching, at the central website system, at least one profile record and generating at least one of: an electronic message, an invite, an alert, or any combination thereof.

18. The method according to claim 1, wherein the at least one online event is at least one of: a meeting, a convention, an exposition, an event, a conference, a trade show, or any combination thereof.

19. A system comprising at least one computer having at least one processor and at least one non-transitory computer-readable medium containing program instructions that, when executed by the at least one processor, cause the at least one processor to:
  a. in response to receiving input at the central website system from a first user, process, build, design, load, control, format, and/or set up at least one online event, wherein the at least one online event is associated with at least one interest;
  b. in response to receiving a selection of the at least one interest by an advertising sponsor, release a list of online events comprising the at least one online event;
  c. in response to receiving a selection of the at least one online event from the list of online events, process, build, design, load, control, format, and/or set up at least one advertising display associated with the advertising sponsor, the at least one advertising display comprising at least one of: a panel, a banner, a button, a link, a navigation bar, a click-on area, a display, a bridge, online content, multimedia content, an exhibit, a demonstration, a presentation, a brochure, a video, a movie, a photograph, a still image, an audio recording, or any combination thereof;
  d. provide a plurality of control parameters to the at least one advertising sponsor, and responsive to a selection of at least one control parameter by the advertising sponsor, electronically set, load, input, place, design, and/or control at least one of: i) a preferred presentation location of the at least one advertising display, ii) at least one exposure factor associated with the at least one advertising display, iii) a specified presentation frequency of the at least one advertising display, iv) a packaging arrangement associated with the at least one advertising display, v) at least one fee option associated with the at least one advertising display, vi) at least one recognition factor associated with the at least one advertising display, or any combination thereof;
  e. receive, from at least one second user at the central website system, a search for at least one interest associated with the at least one online event;
  f. store, in the database at the central website system, the at least one interest in the profile record associated with the at least one second user;
  g. facilitate, at the central website system, participation by the first user and the at least one second user in the at least one online event associated with the at least one interest;
  h. based at least partially on an association between the at least one interest and the at least one advertising display, process the at least one advertising display at the central website system; and
  i. during the at least one online event, release, from the central website system, to at least one of the first user and the at least one second user, at least a portion of the at least one advertising display.

20. A system comprising at least one non-transitory computer-readable medium containing program instructions that, when executed by at least one processor, cause the at least one processor to:
  a. in response to receiving input at the central website system from a first user, process, build, design, load, control, format, and/or set up at least one online event, wherein the at least one online event is associated with at least one interest;
  b. in response to receiving a selection of the at least one interest by an advertising sponsor, release a list of online events comprising the at least one online event;
  c. in response to receiving a selection of the at least one online event from the list of online events, process, build, design, load, control, format, and/or set up at least one advertising display associated with the advertising sponsor, the at least one advertising display comprising at least one of: a panel, a banner, a button, a link, a navigation bar, a click-on area, a display, a bridge, online content, multimedia content, an exhibit, a demonstration, a presentation, a brochure, a video, a movie, a photograph, a still image, an audio recording, or any combination thereof;

d. provide a plurality of control parameters to the at least one advertising sponsor, and responsive to a selection of at least one control parameter by the advertising sponsor, electronically set, load, input, place, design, and/or control at least one of: i) a preferred presentation location of the at least one advertising display, ii) at least one exposure factor associated with the at least one advertising display, iii) a specified presentation frequency of the at least one advertising display, iv) a packaging arrangement associated with the at least one advertising display, v) at least one fee option associated with the at least one advertising display, vi) at least one recognition factor associated with the at least one advertising display, or any combination thereof;

e. receive, from at least one second user at the central website system, a search for at least one interest associated with the at least one online event;

f. store, in the database at the central website system, the at least one interest in the profile record associated with the at least one second user;

g. facilitate, at the central website system, participation by the first user and the at least one second user in the at least one online event associated with the at least one interest;

h. based at least partially on an association between the at least one interest and the at least one advertising display, process the at least one advertising display at the central website system; and i. during the at least one online event, release, from the central website system, to at least one of the first user and the at least one second user, at least a portion of the at least one advertising display.

* * * * *